US012175344B2

(12) United States Patent
Wick et al.

(10) Patent No.: US 12,175,344 B2
(45) Date of Patent: *Dec. 24, 2024

(54) ENFORCING FAIRNESS ON UNLABELED DATA TO IMPROVE MODELING PERFORMANCE

(71) Applicant: Oracle International Corporation, Redwood City, CA (US)

(72) Inventors: Michael Louis Wick, Burlington, MA (US); Swetasudha Panda, Burlington, MA (US); Jean-Baptiste Frederic George Tristan, Burlington, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,929

(22) Filed: Aug. 22, 2023

(65) Prior Publication Data
US 2023/0394371 A1 Dec. 7, 2023

Related U.S. Application Data

(63) Continuation of application No. 16/781,945, filed on Feb. 4, 2020, now Pat. No. 11,775,863.
(Continued)

(51) Int. Cl.
*G06N 20/00* (2019.01)
*G06N 3/088* (2023.01)
(52) U.S. Cl.
CPC ............. *G06N 20/00* (2019.01); *G06N 3/088* (2013.01)
(58) Field of Classification Search
CPC .......... G06N 20/00; G06N 3/088; G06N 7/01; G06Q 10/063112; G06F 16/90335; G06F 16/9538
See application file for complete search history.

(56) References Cited

U.S. PATENT DOCUMENTS 7,720,720 B1 * 5/2010 Sharma .................. G06Q 30/02
705/26.7
11,416,500 B2 8/2022 Tristan et al.
(Continued)

FOREIGN PATENT DOCUMENTS

WO 2020146028 7/2020
WO WO-2020146028 A1 * 7/2020 ............. G06N 20/00

OTHER PUBLICATIONS

Marin, et al., "Importance sampling methods for Bayesian discrimination between embedded models," Oct. 2009, https://arxiv.org/pdf/0910.2325.pdf, pp. 1-16.
(Continued)

*Primary Examiner* — Babar Sarwar
(74) *Attorney, Agent, or Firm* — Robert C. Kowert; Kowert, Hood, Munyon, Rankin & Goetzel, P.C.

(57) ABSTRACT

Fairness of a trained classifier may be ensured by generating a data set for training, the data set generated using input data points of a feature space including multiple dimensions and according to different parameters including an amount of label bias, a control for discrepancy between rarity of features, and an amount of selection bias. Unlabeled data points of the input data comprising unobserved ground truths are labeled according to the amount of label bias and the input data sampled according to the amount of selection bias and the control for the discrepancy between the rarity of features. The classifier is then trained using the sampled and labeled data points as well as additional unlabeled data points. The trained classifier is then usable to determine unbiased classifications of one or more labels for one or more other data sets.

20 Claims, 19 Drawing Sheets

Related U.S. Application Data

(60) Provisional application No. 62/851,481, filed on May 22, 2019.

(56) References Cited

U.S. PATENT DOCUMENTS

| | | | |
|---|---|---|---|
| 11,775,863 | B2 | 10/2023 | Wick |
| 2013/0086082 | A1* | 4/2013 | Park .................. G06F 16/9535 707/748 |
| 2017/0206504 | A1 | 7/2017 | Taylor |
| 2018/0101885 | A1 | 4/2018 | Abhishek |
| 2020/0167512 | A1 | 5/2020 | Chitra |
| 2020/0293951 | A1* | 9/2020 | Johnston ............... G06F 16/906 |
| 2020/0372290 | A1 | 11/2020 | Tristan et al. |
| 2020/0372406 | A1 | 11/2020 | Wick et al. |
| 2020/0372435 | A1* | 11/2020 | Kenthapadi ....... G06F 16/90335 |
| 2020/0372472 | A1 | 11/2020 | Kenthapadi |
| 2021/0049503 | A1* | 2/2021 | Nourian ............. G06F 11/3466 |
| 2021/0374582 | A1 | 12/2021 | Tristan et al. |
| 2022/0036203 | A1* | 2/2022 | Nachum ................ G06N 20/00 |
| 2022/0156646 | A1* | 5/2022 | Farrar ..................... G06N 5/04 |
| 2022/0382768 | A1 | 12/2022 | Tristan et al. |

OTHER PUBLICATIONS

Perrakis, et al., "On the use of marginal posteriors in marginal likelihood estimation via importance sampling," Sep. 2014, https://www.sciencedirect.com/science/article/pii/S0167947314000814, pp. 54-69.
Mullachery, et al, "Bayesian Neural Networks," Jan. 2018, https://arxiv.org/ftp/arxiv/papers/1801/1801.07710.pdf, pp. 1-16.
Kamalov, "Kermel density estimation based sampling for imbalanced class distribution," Feb. 2000, https://www.sciencedirect.com/science/article/pii/S0020025519309740, pp. 1192-1201.
U.S. Appl. No. 18/590,285, filed Feb. 28, 2024, Tristan, et al.
Cynthia Dwork, et al., "Fairness Through Awareness", arXiv:1104.3913v2, Nov. 29, 2011, pp. 1-24.
Cynthia Rudin, et al., "The Age of Secrecy and Unfairness in Recidivism Prediction", Harvard Data Science Review 2.1, Published on Jan. 31, 2020, Updated on Mar. 31, 2020, pp. 1-55.
Muhammad Bilal Zafar, et al, "Fairness Constraints: Mechanisms for Fair Classification", arXiv:1507.05259v5, Mar. 23, 2017, In Proceedings of the 20th International Conference on Artificial Intelligence and Statistics (AISTATS) 2017, pp. 1-12.
Benjamin Fish, et al, "A Confidence-Based Approach for Balancing Fairness and Accuracy", arXiv:1601.05764v1, Jan. 21, 2016, pp. 1-10.
Jon Kleinberg, et al., "Inherent Trade-Offs in the Fair Determination of Risk Scores", arXiv:1609.05807v2, Nov. 17, 2016, pp. 1-23.
Sorelle A. Friedler, et al., "On the (im)possiblity of fairness*", arXiv:1609.07236v1, Sep. 23, 2016, pp. 1-16.
Alexandra Chouldechova, "Fair prediction with disparate impact: A study of bias in recidivism prediction instruments", arXiv:1610.07524v1, Oct. 24, 2016, pp. 1-6.
Muhammad Bilal Zafar, et al, Fairness Beyond Disparate Treatment & Disparate Impact: Learning Classification without Disparate Mistreatment:, arXiv:1610.08452v2, Mar. 8, 2017, pp. 1-10.
Sam Corbett-Davies, et al, "Algorithmic decision making and the cost of fairness", arXiv:1701.08230v4, Jun. 10, 2017, pp. 1-10.
Richard Berk, et al., "A Convex Framework for Fair Regression", arXiv:1706.02409v1, Jun. 7, 2017, pp. 1-15.
Maria-Florina Balcan, et al, "An Augmented PAC Model for Semi-Supervised Learning", 2006, pp. 61-89.
Aditya Krishna Menon, et al., "The Cost of Fairness in Binary Classification", Proceedings of Machine Learning Research 81, 2018, Conference of Fairness, Accountability, and Transparency, pp. 1-12.
Xuerui Wang, et al., "Topics over Time: A Non-Markov Continuous-Time Model of Topical Trends", KDD'06, Aug. 20-23, 2006, ACM, pp. 1-10.
Flavio Chierichetti et al, "Fair Clustering Through Fairlets" (31st Conference on Neural Information Processing Systems), dated 2017, pp. 1-9.
Hoda Heidari et al, "Fairness Behind a Veil of Ignorance: A Welfare Analysis for Automated Decision Making", (32nd Conference on Neural Information Processing Systems), dated 2018, pp. 1-12.
Toon Calders et al, "Three naive Bayes approaches for discrimination-free classification", dated 2010, pp. 277-292.
Cynthia Dwork et al, "Decoupled Classifiers for Group-Fair and Efficient Machine Learning", dated 2018, pp. 1-15.
Faisal Kamiran et al, "Data preprocessing techniques for classification without discrimination", dated Dec. 3, 2011, pp. 1-33.
Ehsan Kazemi et al, "Data Summarization with Privacy and Fairness Constraints", (Proceedings of the 35th International Conference on Machine Learning), dated 2018, pp. 1-10.
Junpei Komiyama et al, "Nonconvex Optimization for Regression with Fairness Constraints", (Proceedings of the 35th International Conference on Machine Learning), dated 2018, pp. 1-10.
Samira Samadi et al, "The Price of Fair PCS: One Extra Dimension", dated Oct. 31, 2018, pp. 1-19.
Michael Feldman et al., "Certifying and removing disparate impact", dated Jul. 16, 2015, pp. 1-28.
Matthew Joseph et al., "Fairness in Learning: Classic and Contextual Bandits", Nov. 7, 2016, pp. 1-28.
Thorsten Joachims et al., "Unbiased Learning-to-Rank with Biased Feedback", Aug. 16, 2016, pp. 1-10.
Hardt et al., "Equality of Opportunity in Supervised Learning", Oct. 7, 2016, pp. 1-22.
Ke Yang et al., "Measuring Fairness in Ranked Outputs", Oct. 26, 2016, pp. 1-5.
Shahin Jabbari et al., "Fairness in Reinforcement Learning", Aug. 6, 2017, pp. 1-23.
L. Elisa et al., "Ranking with Fairness Constraints", Jul. 30, 2018, pp. 1-32.
Sampath Kannan et al., "Fairness Incentives for Myopic Agents", May 5, 2017, pp. 1-23.
Meike Zehlike et al., "FA*IR: A Fair Top-k Ranking Algorithm", Jul. 2, 2018, pp. 1-10.
Danielle Ensign et al., "Runaway Feedback Loops in Predictive Policing", Dec. 22, 2017, pp. 1-12.
Muhammad Bilal Zafar et al., "From Parity to Preference-based Notions of Fairness in Classification", Nov. 28, 2017, pp. 1-14.
Amanda Bower et al., "Fair Pipelines", Jul. 3, 2017, pp. 1-5.
Cynthia Dwork et al., "Decoupled classifiers for fair and efficient machine learning", Jul. 20, 2017, pp. 1-20.
Michael Kearns et al., "Preventing Fairness Gerrymandering: Auditing and Learning for Subgroup Fairness", Dec. 3, 2018, pp. 1-34.
David Madras et al., "Predict Responsibly: Improving Fairness and Accuracy by Learning to Defer", Sep. 7, 2018, pp. 1-20.
Ursula Hebert-Johnson et al., "Calibration for the (Computationally-Identifiable) Masses", Mar. 16, 2018, pp. 1-40.
Abolfazl Asudeh et al., "Designing Fair Ranking Schemes", Jan. 4, 2018, pp. 1-16.
L. Elisa Celis et al., "Fair and Diverse DPP-based Data Summarization" Feb. 12, 2018, pp. 1-25.
Stephen Gillen et al., "Online Learning with an Unknown Fairness Metric", Sep. 18, 2018, pp. 1-27.
Ashudeep Singh et al., "Fairness of Exposure in Rankings", Oct. 17, 2018, pp. 1-10.
Michele Donini et al., "Empirical Risk Minimization Under Fairness Constraints", Jan. 31, 2020, pp. 1-17.
Alekh Agarwal et al., "A Reductions Approach to Fair Classification", Jul. 16, 2018, pp. 1-18.
Michael P. Kim et al., "Fairness Through Computationally-Bounded Awareness", Nov. 28, 2018, pp. 1-19.
Guy N. Rothblum et al., "Probably Approximately Metric-Fair Learning", Jul. 1, 2018, pp. 1-40.
Asia J. Biega et al., "Equity of Attention: Amortizing Individual Fairness in Rankings", May 4, 2018, pp. 1-10.
Meike Zehlike et al., "Reducing Disparate Exposure in Ranking: A Learning to Rank Approach", May 27, 2020, pp. 1-7.
Isabel Valera et al., "Enhancing the Accuracy and Fairness of Human Decision Making", May 25, 2018, pp. 1-11.

(56) References Cited

OTHER PUBLICATIONS

Nathan Kallus et al., "Residual Unfairness in Fair Machine Learning from Prejudiced Data", Jun. 7, 2018, pp. 1-14.
Niki Kilbertus et al., "Blind Justice: Fairness with Encrypted Sensitive Attributes", Jun. 8, 2018, pp. 1-15.
Tatsunori B. Hashimoto et al., "Fairness Without Demographics in Repeated Loss Minimization", Jul. 30, 2018, pp. 1-18.
Sam Corbett-Davies et al., "The Measure and Mismeasure of Fairness: A Critical Review of Fair Machine Learning", Aug. 14, 2018, pp. 1-25.
N. Friel, et al., "Estimating the model evidence: a review", arXiv:1111.1957v1, Nov. 2011, pp. 1-21.
A. Mootoovaloo, et al., "Bayes Factors via Savage-Dickey Supermodels", arXiv:1609.02186v1, Sep. 7, 2016, pp. 1-24.
J. Mulder, et al., "A Generalization of the Savage-Dickey Density Ratio for Testing Equality and Order Constrained Hypotheses", arXiv:2004.09899v1, Apr. 21, 2020, pp. 1-15.
Andrew Gelman, et al., "Simulating Normalizing Constants: From Importance Sampling to Bridge Sampling to Path Sampling", Statistical Science 1998, vol. 13, No. 2, pp. 163-185.
Wikipedia, "Kernel density estimation", Retrieved from https://en.wikipedia.org/wiki/Kernel_density_estimation on, Jun. 19, 2020, pp. 1-13.
Matthew D. Hoffman, et al., "The No-U-Turn Sampler: Adaptively Setting Path Lengths in Hamiltonian Monte Carlo", Journal of Machine Learning Research 15, 2014, pp. 1593-1623.
Michael G. Aamodt, et al., "Technical Advisory Committee Report on Best Practices in Adverse Impact Analyses", Published Sep. 2010, The Center for Corporate Equality, pp. 1-98.
Goenner, "Discrimination and Mortgage Lending in Boston: The Effects of Model Uncertainty," 2010, The Journal of Real Estate Finance and Economics, vol. 40, pp. 260-285, 2010.
Radivojac, et al., "Feature Selection Filters based on the Permutation Test," Springer-Verlag Berlin Heidelberg 2004, European Conference on Machine Learning, pp. 334-346.
Geyik, et al, "Fairness-Aware Ranking in Serch & Recommendation Systems with Application to LinkedIn Talent Search", May 21, 2019, arXiv: v1905.01989v2, pp. 1-11, 2019.
Rouder, et al, "Bayesian t tests for accepting and rejecting the null hypothesis," 2019, Psychonomic Bulleting & Review, vol. 15(2), pp. 225-237.
Boring, et al., "Student evaluations of teaching (mostly) do not measure teaching effectiveness," 2016, ScienceOpen Research, 2016.
Wuest, et al., "Machine Learning in Manufacturing: advantages, challenges, and applications," Production & Manufacturing Research 4(1), pp. 23-45, 2016.
Wu, et al., "Hyperparameter optimization for machine learning models based on Bayesian optimization," Jouranl of Electronic Scient and Technology, 17(1), pp. 26-40, 2019.
Hunag, et al., "Riffled Independence for Ranked Data," 2009, Advances in Neural Information Processing Systems, vol. 22, pp. 1-9.
Prodinger, et al., "Unfair permutations," 2011, European Journal of Combinatorics, vol. 32, No. 8, pp. 1282-1298.

* cited by examiner ns ENFORCING FAIRNESS ON UNLABELED
DATA TO IMPROVE MODELING
PERFORMANCE

PRIORITY INFORMATION

This application is a continuation of U.S. patent application Ser. No. 16/781,945, filed Feb. 4, 2020, which claims benefit of priority to U.S. Provisional Application Ser. No. 62/851,481, entitled "Enforcing Fairness on Unlabeled Data to Improve Modeling Performance," filed May 22, 2019, and which are incorporated herein by reference in their entirety.

BACKGROUND

Field of the Disclosure

This disclosure relates to generating data sets to improve classification performance in machine learning.

Description of the Related Art

Machine learning systems are increasingly employed to improve decision making in business applications, but when machine learning systems participate in decision making in certain domains, such as credit or employment, there is a need to ensure that the system is free of bias, often according to rules and definitions set forth by regulatory bodies in those domains. Indeed, bias in this context often refers to some measure of discrepancy between the behavior of a machine learning system and mathematical rules established by these external regulatory bodies. Machine learning models are often developed using training data that themselves were created with unintended biases. This manifests as bias in results when the models are applied.

Existing approaches include training the classifier with some form of fairness constraint on the training data or perform postprocessing at test time to enforce fairness. In either case, enforcing fairness is thought to decrease accuracy, and the consensus is there is a trade-off between fairness and accuracy. Hence, the only available solution to this problem is to find the appropriate balance between fairness and accuracy.

SUMMARY

A trained classifier with enforced fairness may be generated, in various embodiments, using a data set for training with known characteristics including a known amount of label bias, a known discrepancy between rarity of features and a known amount of selection bias. In some embodiments, unlabeled data points of input data comprising unobserved ground truths are labeled according to the amount of label bias and the input data sampled according to the amount of selection bias and the control for the discrepancy between the rarity of features to produce the data set. The classifier is then trained using the data set as well as additional unlabeled data points and training parameters including the amount of label bias, the discrepancy between rarity of features and the amount of selection bias. The trained classifier is then usable to determine unbiased classifications of one or more labels for one or more other data sets.

Figure 1:
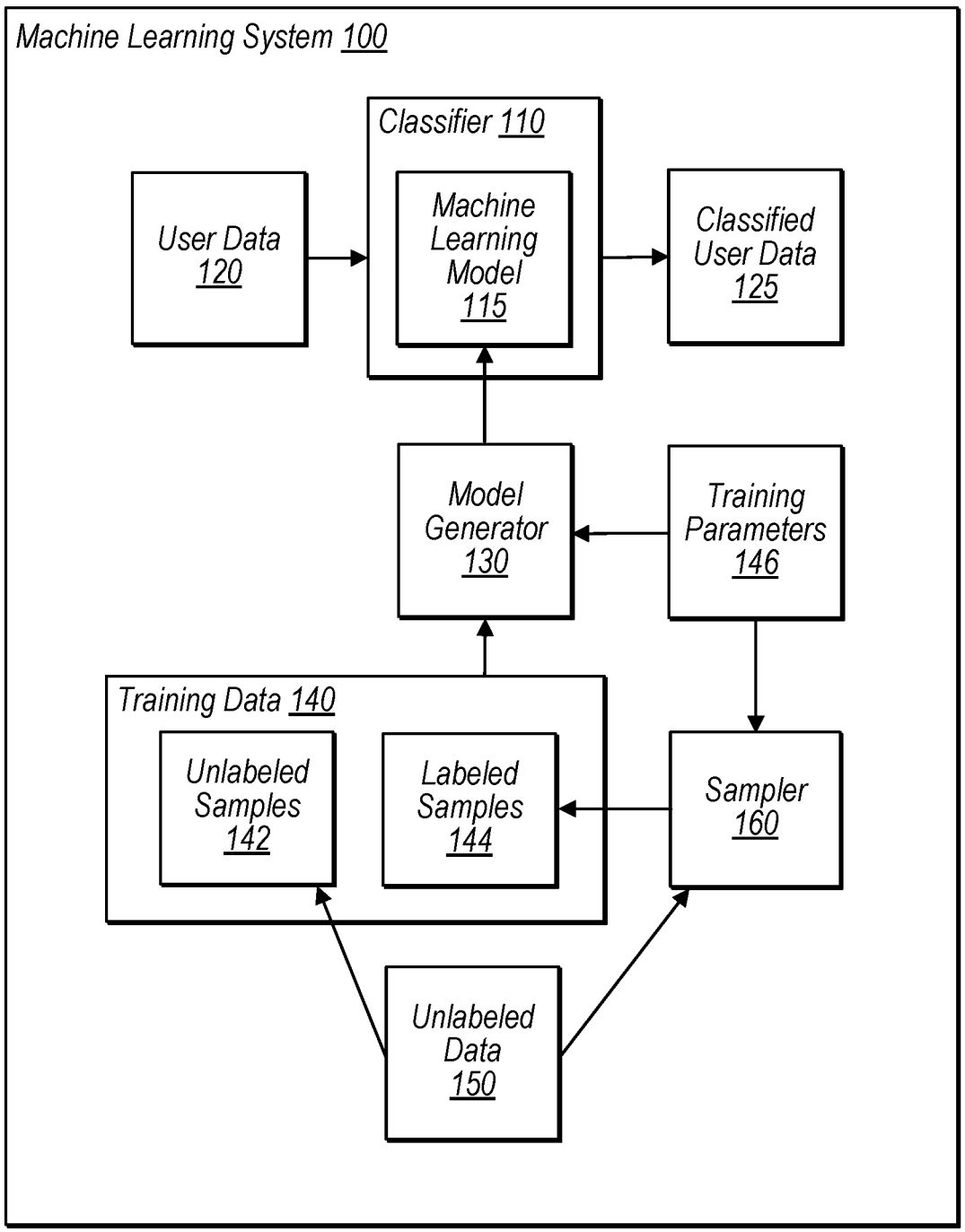
FIG. 1 is a block diagram of an exemplary machine learning system, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Various techniques for enforcing fairness on unlabeled data to improve modeling performing are described herein. Machine learning systems often make use of several datasets and a variety of different learning algorithms such as word embeddings, classification, clustering, learning to rank (LTR), and so on. When these systems are employed to improve systems, services, or other applications (e.g., business decision-making, consumer product recommendations, analytics, security, etc.), they are used in decision making that in certain domains, for example in financial or employment domains, may need to ensure freedom from bias often according to rules and definitions set forth by regulatory bodies in those domains. For example, in some embodiments, bias may refer to some measure of discrepancy between the behavior of a machine learning system and mathematical rules established by these external regulatory bodies.

Building machine learning models so that they are not only accurate but also free of bias is therefore important, especially as these models increasingly guide decisions that affect people's lives. In conventional machine learning models accuracy decreases as fairness, or absence of bias, improves but this generalization is often counter-intuitive. For example, certain personal attributes such as race, age, gender or religion, which may in some contexts be considered protected classes, may be unrelated to, for example, a person's job qualification status. Therefore, enforcing fairness by reducing or eliminating bias across these attributes in these circumstances may increase accuracy. On the other hand, if a machine learning classifier produces, for example, job qualification rankings dependent on the values of such attributes, then it may be the case that there is an opportunity to improve accuracy of the classifier.

In various embodiments, machine learning classifiers may produce results containing bias dependent on unrelated attributes due to the machine learning models being developed using training data created with unintended biases. Two possible sources of unintended bias may include label bias and selection bias, in some embodiments. Label bias may occur, in some embodiments, when the process that produces the labels, for example a manual annotation process or a decision making process, is influenced by factors that are not germane to the determination of the label value, and thus might differ from ideal, unbiased labels. Accuracy may be measured against any such biased labels should be considered carefully. Selection bias may occur, in some embodiments, when selecting a subsample of data in such a way that introduces unexpected correlations between samples. For example, if the subsample selection were to produce an unexpected correlation between a personal attribute and the target label, then selection bias may be present. Training data, which may usually be derived via selection from a larger set of unlabeled data and subsequently frozen in time, may be especially prone to this selection bias.

Various techniques for enforcing fairness on unlabeled data may improve modeling performance when an accounting is made for the unintended biases in the training data used. In various embodiments, techniques for enforcing fairness on unlabeled data may improve the accuracy of machine learning classifiers. For instance, in some embodiments, these techniques may harness bias constraints over large quantities of unlabeled data as additional training signals for the training of machine learning models. These embodiments may result in classifiers with improvements in both absence of bias and accuracy, even if the training data itself contains a large amount of bias, where the amount of bias is expressed as a percentage of possible bias. Moreover, such techniques may have advantages over existing methods for enforcing fairness, such as in-processing, which fail when exposed to selection bias.

FIG. 1 is a block diagram of an exemplary Machine Learning System 100 according to some embodiments. The Machine Learning System 100 may include a Classifier 110 which applies a Machine Learning Model 115 to User Data 120 to produce Classified User Data 125 including generated unbiased classifications of the user data. The Machine Learning Model 115 may be generated in various embodiments of a Model Generator 130 as discussed further in FIGS. 2A and 3 below.

Embodiments of the Machine Learning System 100 generating unbiased classifications of user data may be useful in a wide variety of environments including, for example, business decision-making, consumer product recommendations, analytics, security, business an personal financial decisions, advertising, etc. Examples of applications incorporating fair machine learning classifiers may include human resources, credit authorization, financial transactions, public and private web-based services such as advertising and security and any number of other applications where fairness of decision-making is of importance.

To generate the Machine Learning Model 115, the Machine Learning System 100 may also include a Model Generator 130 which employs semi-supervised learning utilizing Training Data 140 that includes both Labeled Samples 144 and Unlabeled Samples 142, as discussed in FIGS. 5-8 below. The Model Generator 130 may additionally use Training Parameters 146 which are used in some embodiments by Sampler 160 in the generation of the Labeled Samples 144 from Unlabeled Data 150 for which values of unbiased labels may be known, as discussed further in FIGS. 5-8 below.

Figure 10:
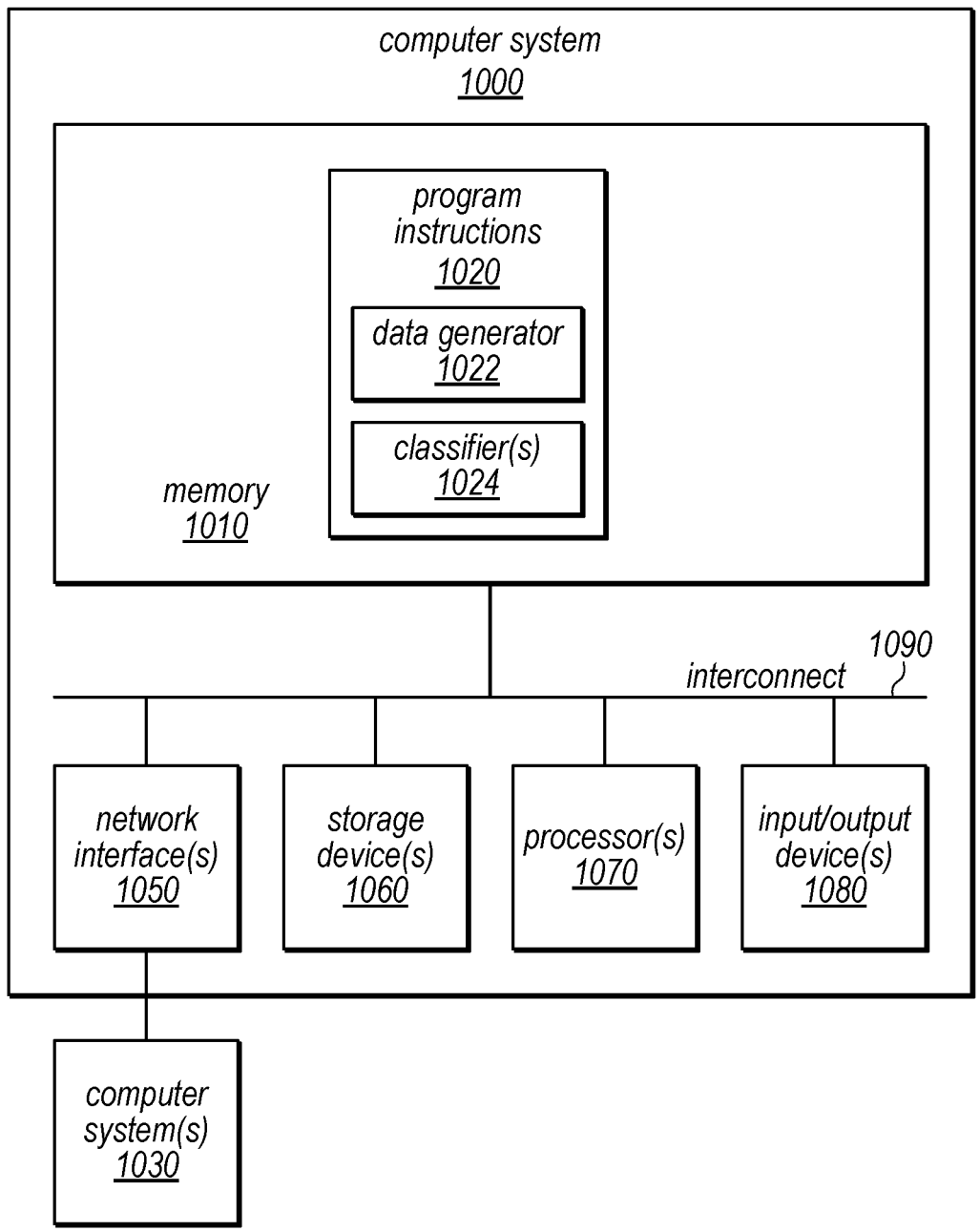
FIG. 10 illustrates an example computing system, according to some embodiments.

Those skilled in the art will recognize that the Machine Learning System 100 may in some embodiments be implemented using a single computing system such as shown in FIG. 10 below or using a distributed computing system including multiple computing systems as shown in FIG. 10. Other embodiments the Machine Learning System 100 may use different computing systems or distributed computing systems to implement some or all of the respective Sampler 160, Model Generator 130 and Classifier 110 components of the Machine Learning System 100 and that various means of communicating between the respective components may be employed including, for example, network interfaces, storage devices, user interface devices and application programming interfaces. In some embodiments, for example, first and second distributed computing systems may be employed to respectively implement the Sampler 160 and Model Generator 130 components of the Machine Learning System 100. In these embodiments, the Training Data 140 and the Training Parameters 146 may be communicated from the first distributed system via network communications or using shared storage. In other embodiments, Training Parameters 146 may be communicated via a user interface or through an application programming interface (API) to both the Sampler 160 implemented on a first system and to the Model Generator 130 implemented on the second system, with the Training Data 140 generated by the Sampler 160 and shared using a network storage service. The above examples, however, of are merely illustrative and are not intended to be limiting.

By employing semi-supervised learning techniques with knowledge of the Training Parameters 146, used in creation of the Labeled Samples 144 of the Training Data 140, the Model Generator 130 may generate a Machine Learning Model 115 with both improved fairness and accuracy, as is shown further in FIGS. 5-8 below.

Figure 2A:
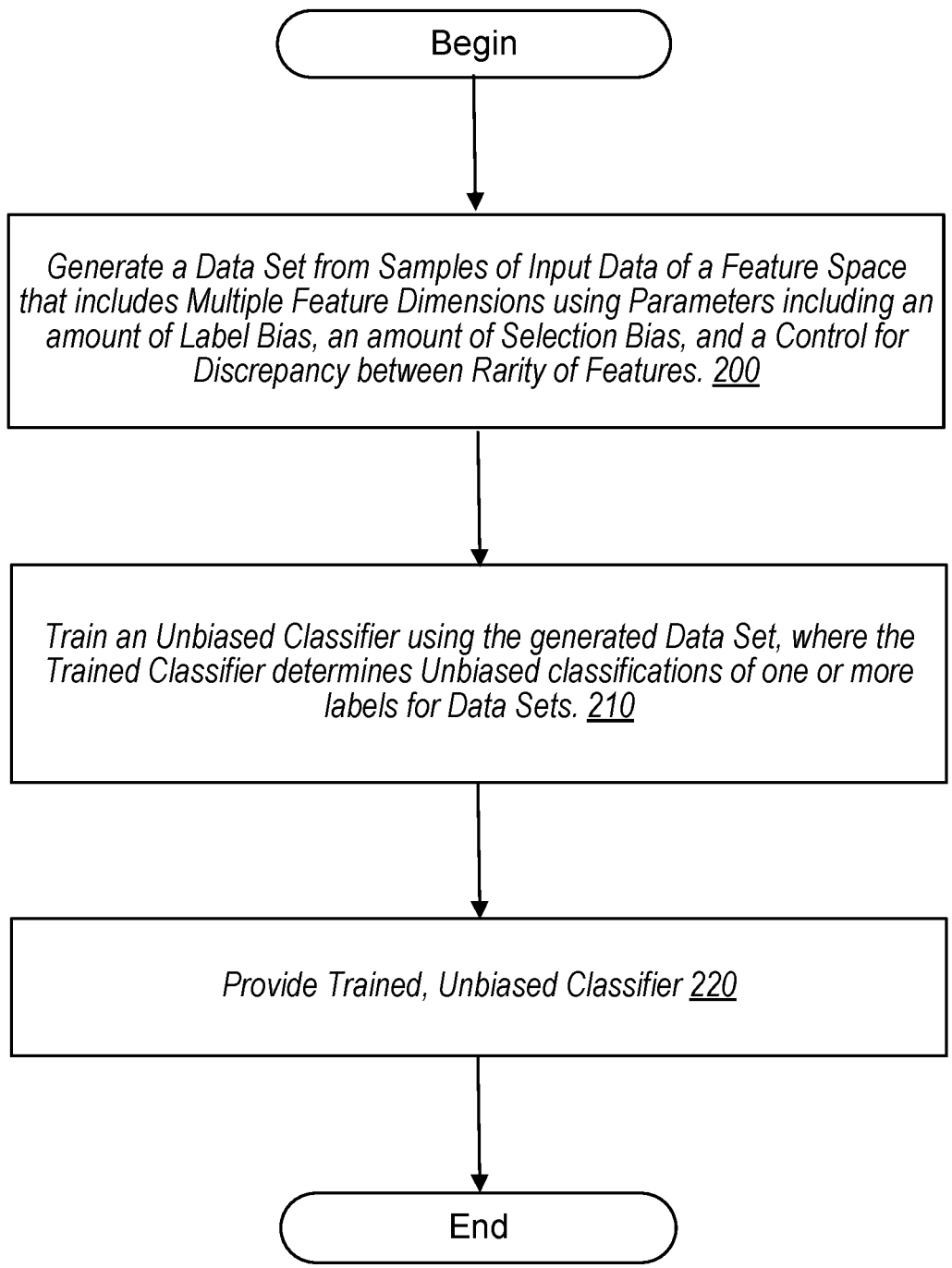
FIG. 2A is a flow diagram illustrating methods and techniques for generating an unbiased classifier, according to some embodiments.
Figure 2B:
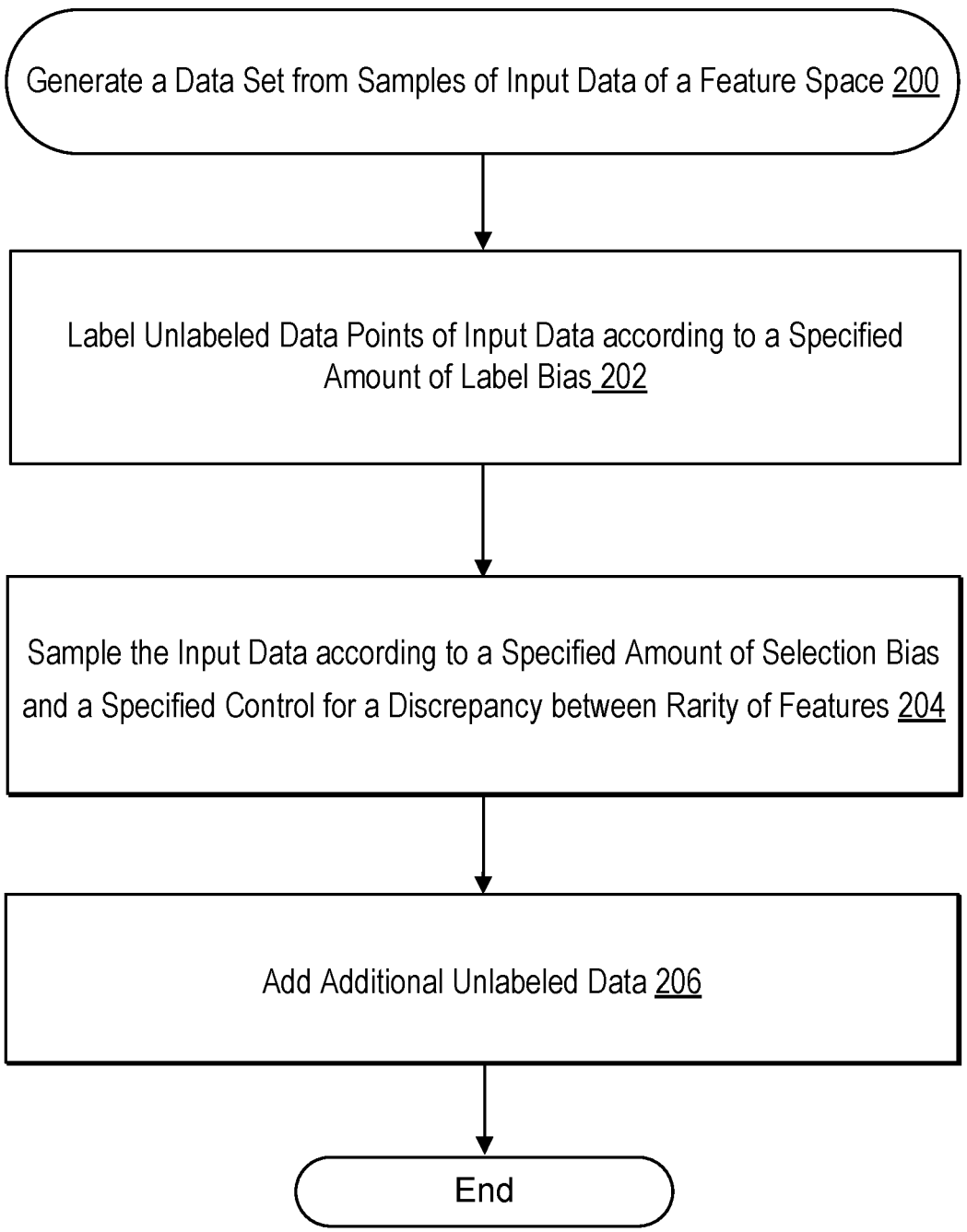
FIG. 2B is a flow diagram illustrating methods and techniques for generating a data set for use in training an unbiased classifier, according to some embodiments.

FIG. 2A is a flow diagram illustrating a techniques for generating an unbiased classifier, according to some embodiments. In some embodiments, a machine learning system, such as the Machine Learning System 100, as discussed in connection with FIG. 1, may perform the below techniques. In other embodiments, other systems such as data collection or aggregation systems, data stream processing systems, or other systems, services, or applications that may obtain information that may be used to generate a data set for training a machine learning classifier. As indicated at 200, a data set, such as Training Data 140, may be generated from samples of input data, such as Labeled Samples 144, of a feature space that includes multiple feature dimensions using parameters, such as Training Parameters 146, that include an amount of label bias, an amount of selection bias, and a control for discrepancy between rarity of features. In some embodiments, the feature dimensions may be binary, or two valued, dimensions while in other embodiments, one of more of the feature dimensions may include more than two possible values while other dimensions are binary. FIG. 2B, discussed below, describes further details and techniques for generating the data set.

As indicated at 210, an unbiased classifier, such as the Classifier 110, may be trained using the generated data set, resulting in a trained classifier that determines unbiased classifications of one or more labels, such as Classified User Data 125, when applied to data sets such as User Data 120. The training of the unbiased classifier using the data set by the machine learning system is discussed in further detail in FIG. 4 below. As indicated at 220, a trained, unbiased classifier model, such as the Machine Learning Model 115, may then be provided.

For example, in some embodiments a machine learning classifier for identifying potential job candidates may be employed. Associated with the classifier is a requirement that candidate selections be made without bias with respect to personal attributes of the candidates, for example the gender of the candidates. In this example embodiment, a data set is generated from samples of input data according to training parameters that control amounts of bias with respect to the gender of the candidates. This bias may be manifest in both the labeling of the protected attribute, i.e. gender, and other attributes of each candidate. Using this generated data set, along with the training parameters, the classifier is trained to determine job candidates absent bias with respect to gender.

FIG. 2B is a flow diagram illustrating methods and techniques for generating a data set for use in training an unbiased classifier, according to some embodiments. In some embodiments, a machine learning system, such as the Machine Learning System 100, as discussed in connection with FIG. 1, may perform the below techniques. In other embodiments, other systems such as data collection or aggregation systems, data stream processing systems, or other systems, services, or applications that may obtain information that may be used to generate a data set for training a machine learning classifier. As indicated in operation 202 unlabeled data points of input data, for which values of unbiased labels are known or may be determined, such as Unlabeled Data 150, may be labeled according to a specified amount of label bias. As values of unbiased labels of the input data are known or may be determined, an amount of label bias may be simulated according to a specified amount of label bias. The labeling of unlabeled data according to a specified amount of label bias is discussed in further detail in FIGS. 5-8 below.

As indicated in operation 204, the labeled input data may be sampled according to a specified amount of selection bias and a specified control for a discrepancy between rarity of features to produce labeled samples of the data set such as Labeled Samples 144. This sampling of labeled input data specified amount of selection bias and a specified control for a discrepancy between rarity of features is discussed in further detail in FIGS. 5-8 below. The amount of label bias, amount of selection bias and specified control for a discrepancy between rarity of features may in some embodiments be portions of the Training Parameters 146, as discussed in connection with FIG. 1. These parameters may be specified any number of means in various embodiments. In some embodiments, these parameters may be specified by a user via a programmatic request or through an application programming interface (API) while in other embodiments the parameters may be determined automatically, for example through analysis of data or though selection of one of a sequence of possible training parameters. Those skilled in the art will appreciate, however, that the above examples of sources of training parameters are merely illustrative and are not intended to be limiting. The machine learning system then adds, in operation 206, additional unlabeled data to the data set, such as Unlabeled Data 142. At this point the generation of the data set is complete.

Figure 3:
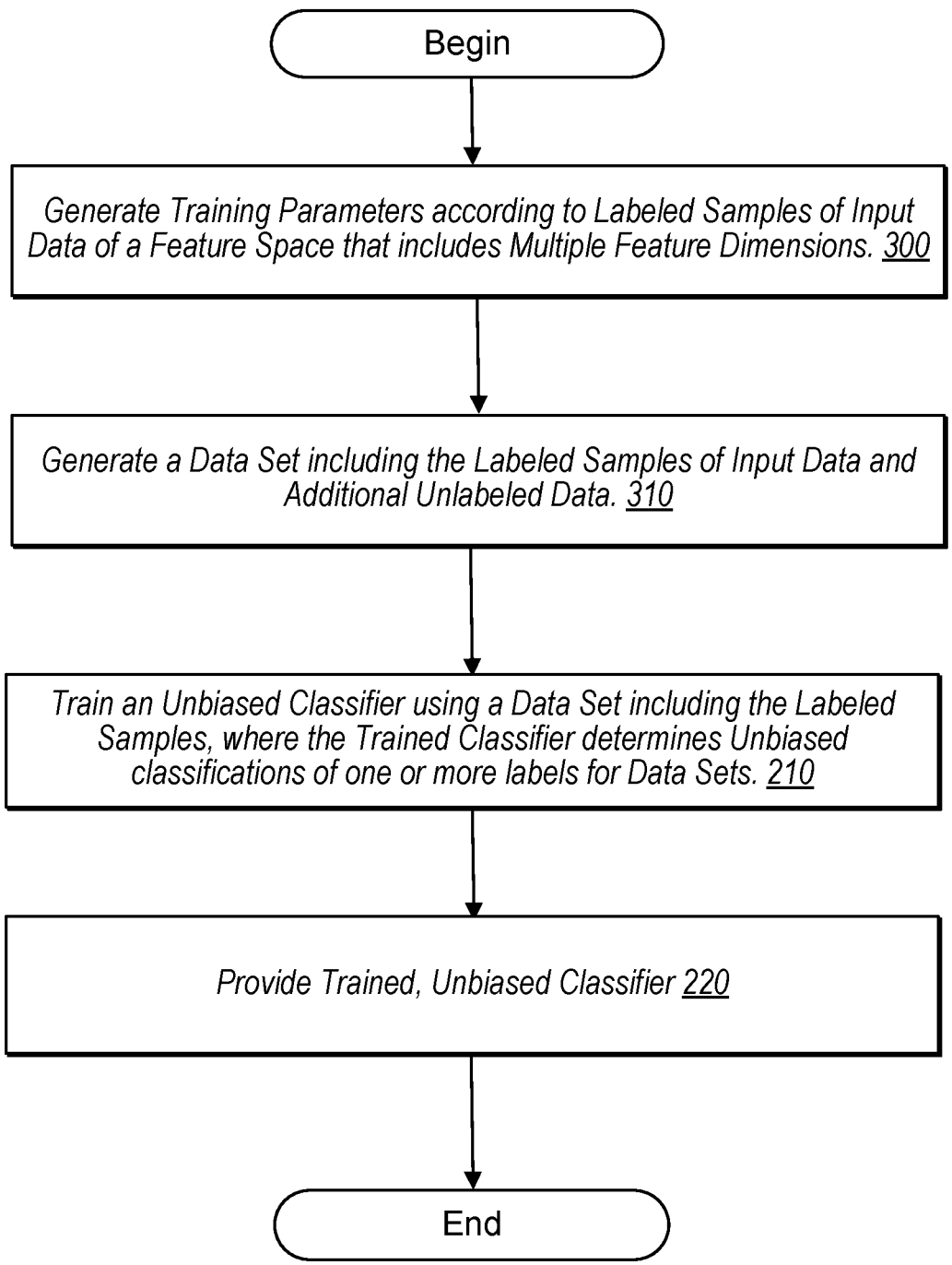
FIG. 3 is a flow diagram illustrating methods and techniques for generating an unbiased classifier, according to some embodiments.

FIG. 3 is a flow diagram illustrating methods and techniques for generating an unbiased classifier, according to some embodiments. In some embodiments, a machine learning system, such as the Machine Learning System 100, as discussed in connection with FIG. 1, may perform the below techniques. In other embodiments, other systems such as data collection or aggregation systems, data stream processing systems, or other systems, services, or applications that may obtain information that may be used to generate a data set for training a machine learning classifier. As indicated at 300, labeled samples, such as Labeled Samples 144, may include an amount of label bias, an amount of selection bias, and a discrepancy between rarity of features. Training parameters including an amount of label bias, an amount of selection bias, and a discrepancy between rarity of features, may be determined from the labeled samples. In some embodiments, these parameters may be previously known characteristics of the labeled samples, while in other embodiments the parameters may be specified by a user via a programmatic request or through an application programming interface (API). In still other embodiments the parameters may be determined through programmatic analysis of the labeled samples. Those skilled in the art will appreciate, however, that the above examples of sources of training parameters are merely illustrative and are not intended to be limiting.

As indicated at 310, a data set, such as Training Data 140, may be generated from labeled samples and from unlabeled samples, such as Unlabeled Samples 142, taken from unlabeled data such as Unlabeled Data 150.

As indicated at 210 of FIG. 3, an unbiased classifier, such as the Classifier 110, may be trained using the generated data set and the generated training parameters, resulting in a trained classifier that determines unbiased classifications of one or more labels, such as Classified User Data 125, when applied to data sets such as User Data 120. The training of the unbiased classifier using the data set by the machine learning system is discussed in further detail in FIG. 4 below. As indicated at 220, a trained, unbiased classifier model, such as the Machine Learning Model 115, may then be provided.

For example, in some embodiments a machine learning classifier for identifying potential job candidates may be employed. Associated with the classifier is a requirement that candidate selections be made without bias with respect to personal attributes of the candidates, for example the gender of the candidates. In this example embodiment, labeled samples with amounts of bias with respect to the gender of the candidates is used to generate training parameters. These amounts of bias may be previously known or may be determined through programmatic analysis of the labeled samples. Using these generated training parameters along with a data set including the labeled samples and additional unlabeled data, the classifier is trained to determine job candidates absent bias with respect to gender.

Figure 4:
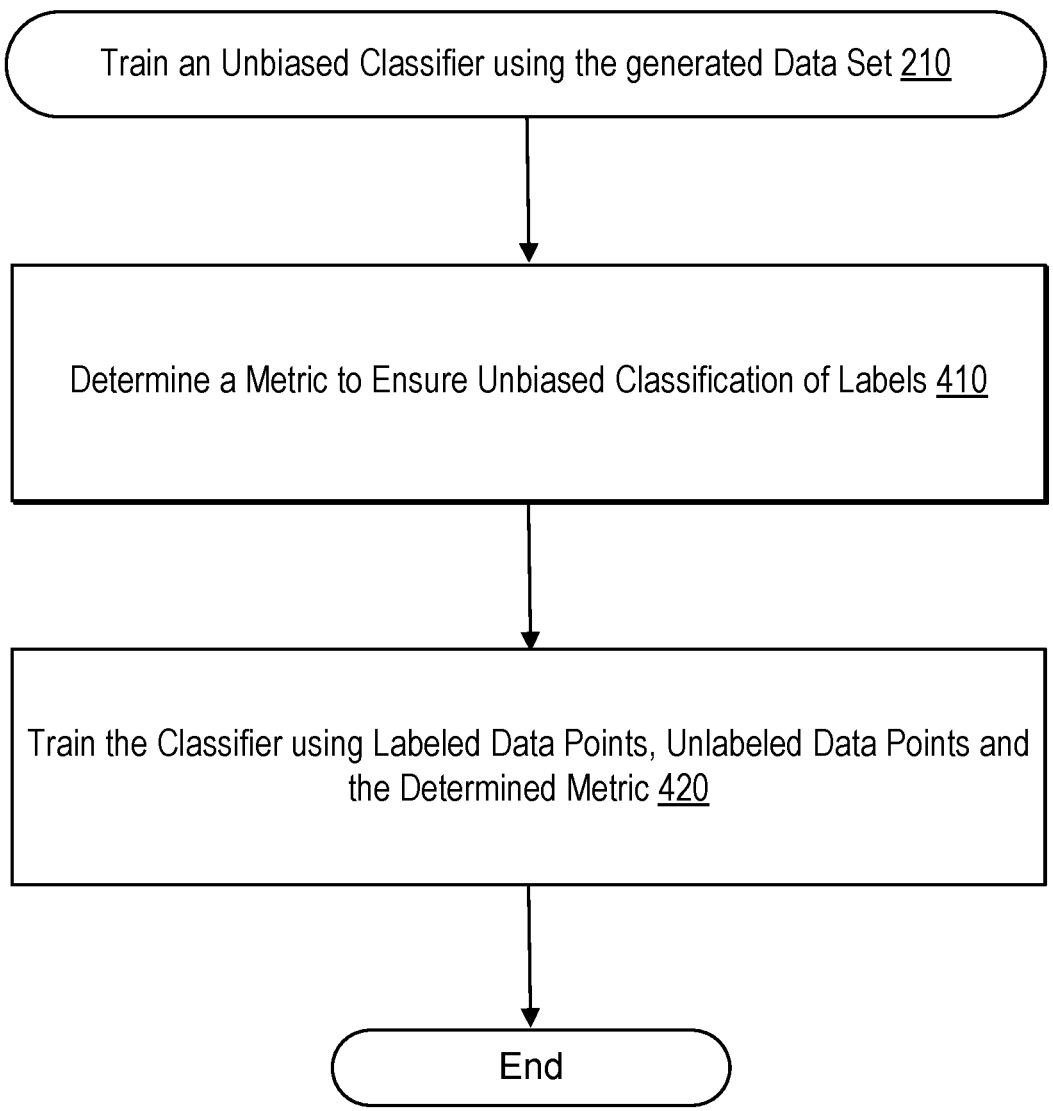
FIG. 4 is a flow diagram illustrating methods and techniques for training an unbiased classifier using a generated data set, according to some embodiments.
Figure 5A:
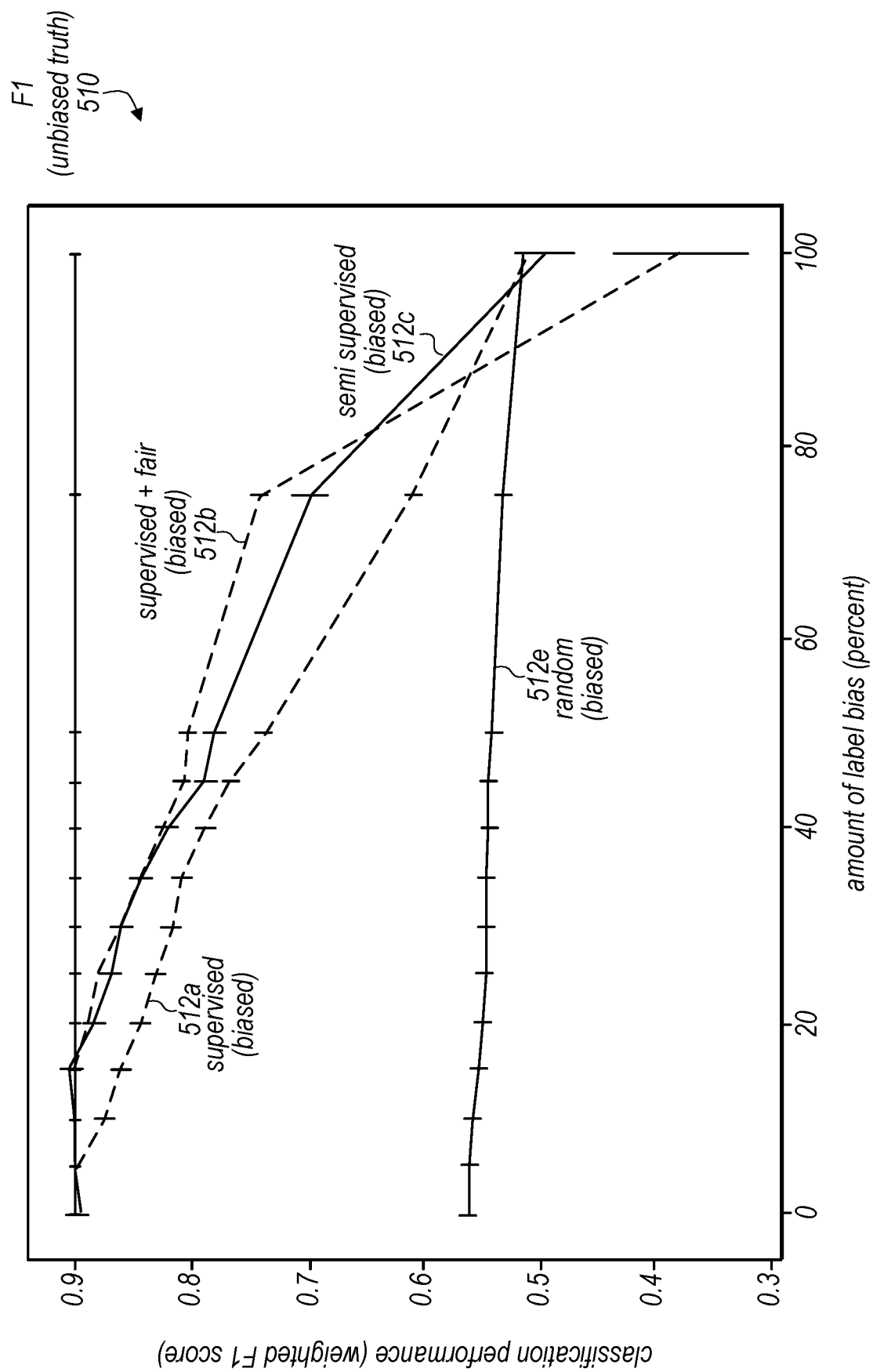
FIGS. 5A-5C illustrate example classification performance of differently trained classifiers for amounts of label bias, according to some embodiments.
Figure 5B:
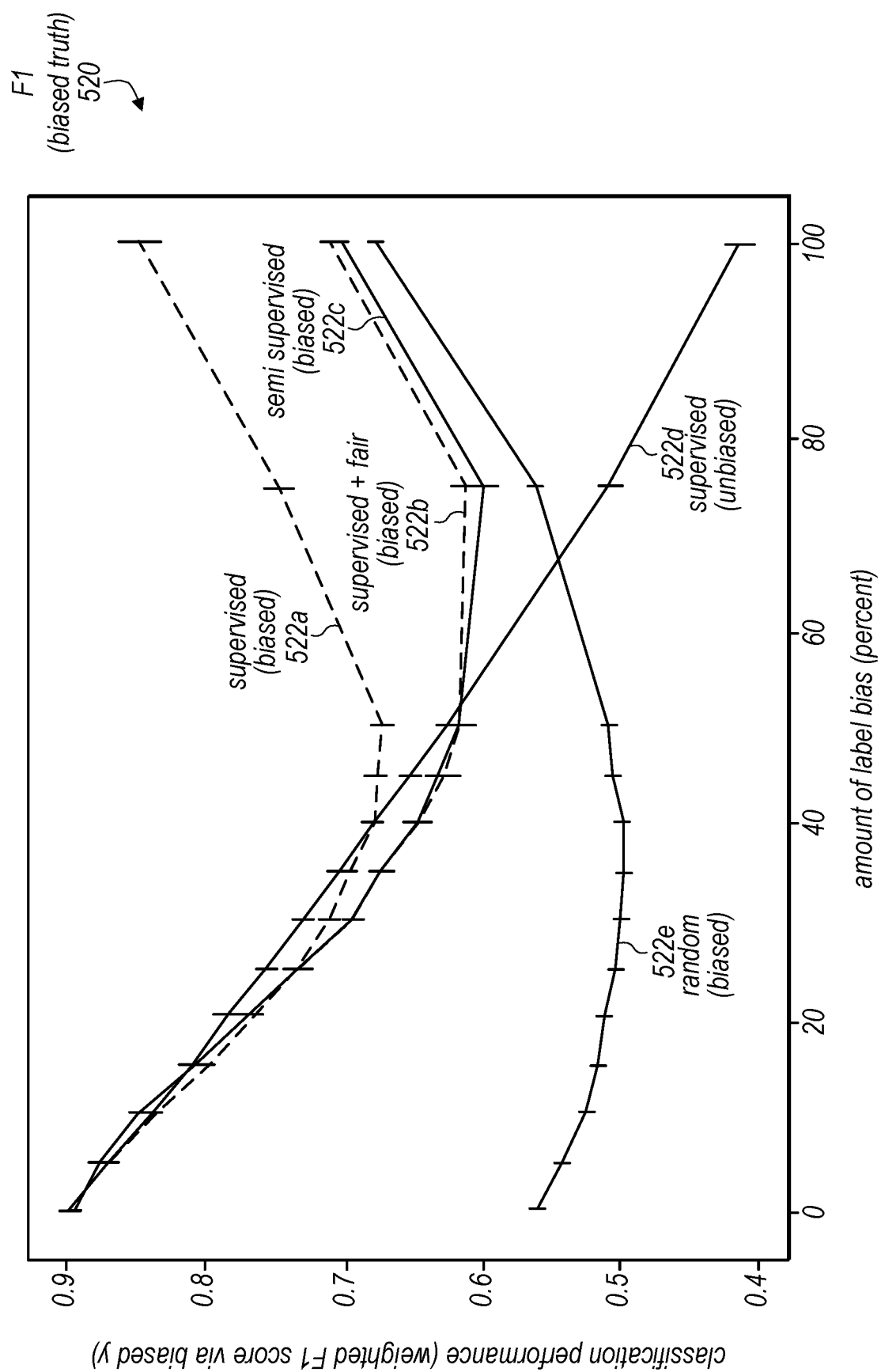
Figure 5C:
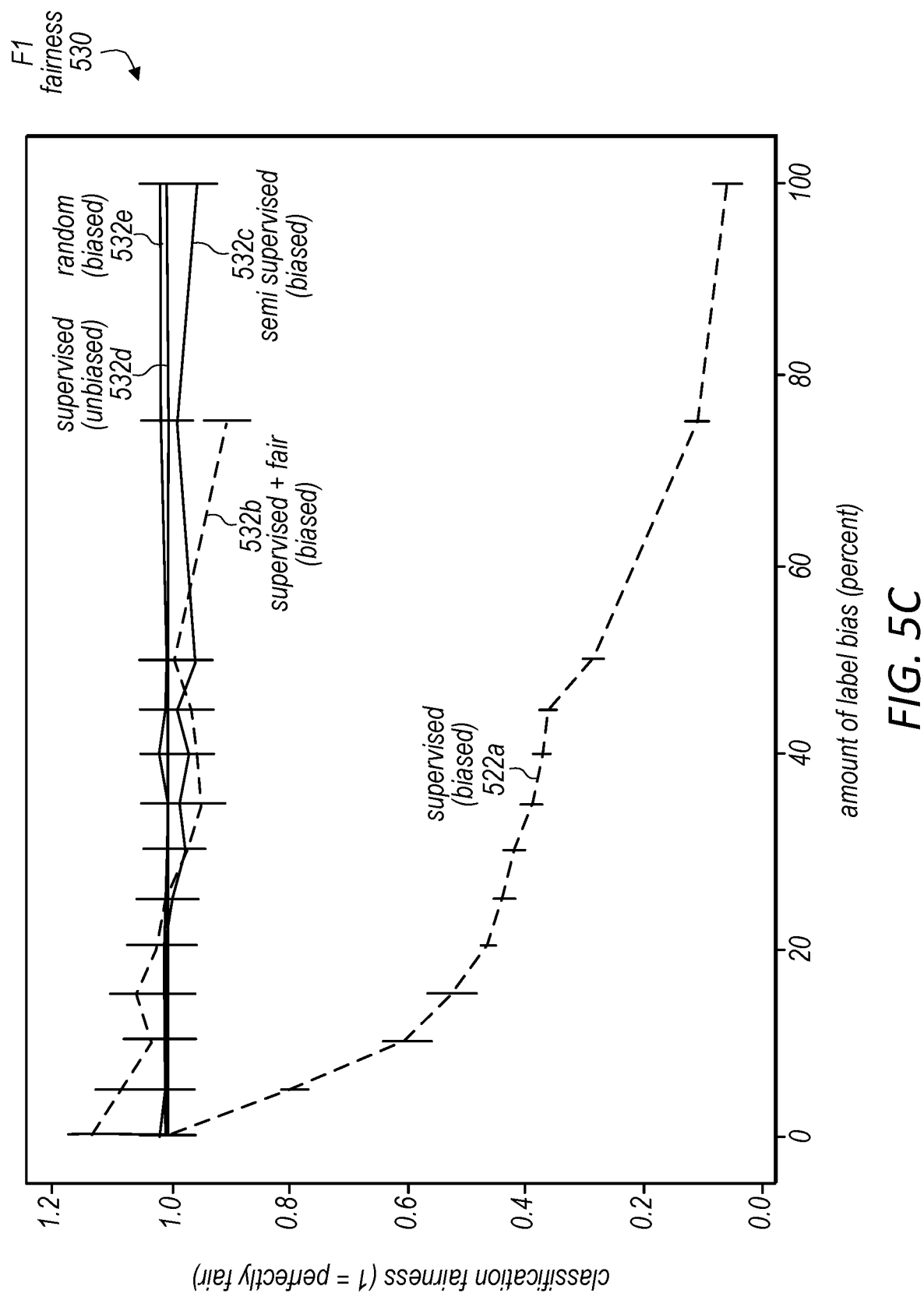
Figure 6A:
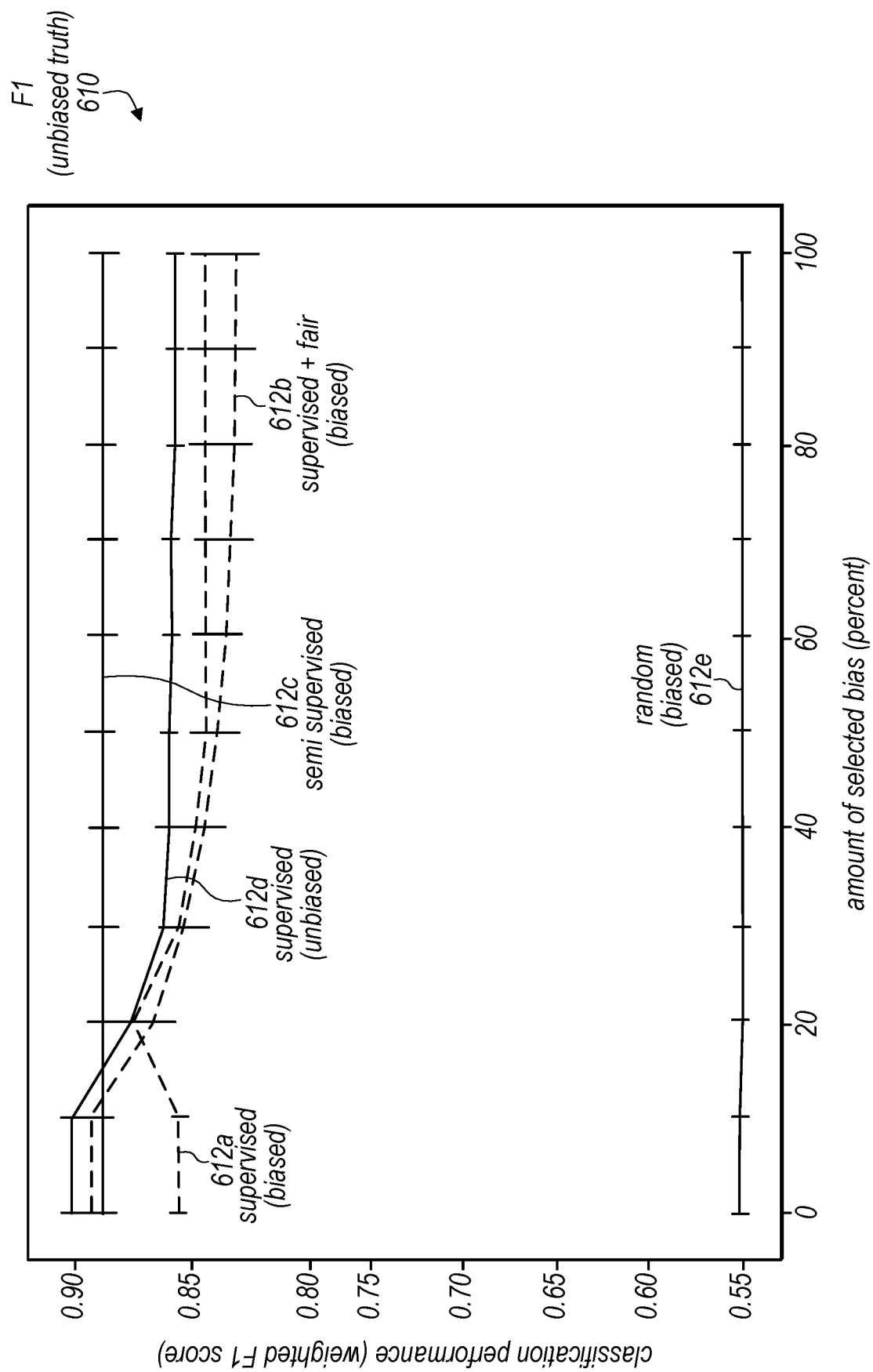
FIGS. 6A-6C illustrate example classification performance of differently trained classifiers for amounts of selected bias, according to some embodiments.
Figure 6B:
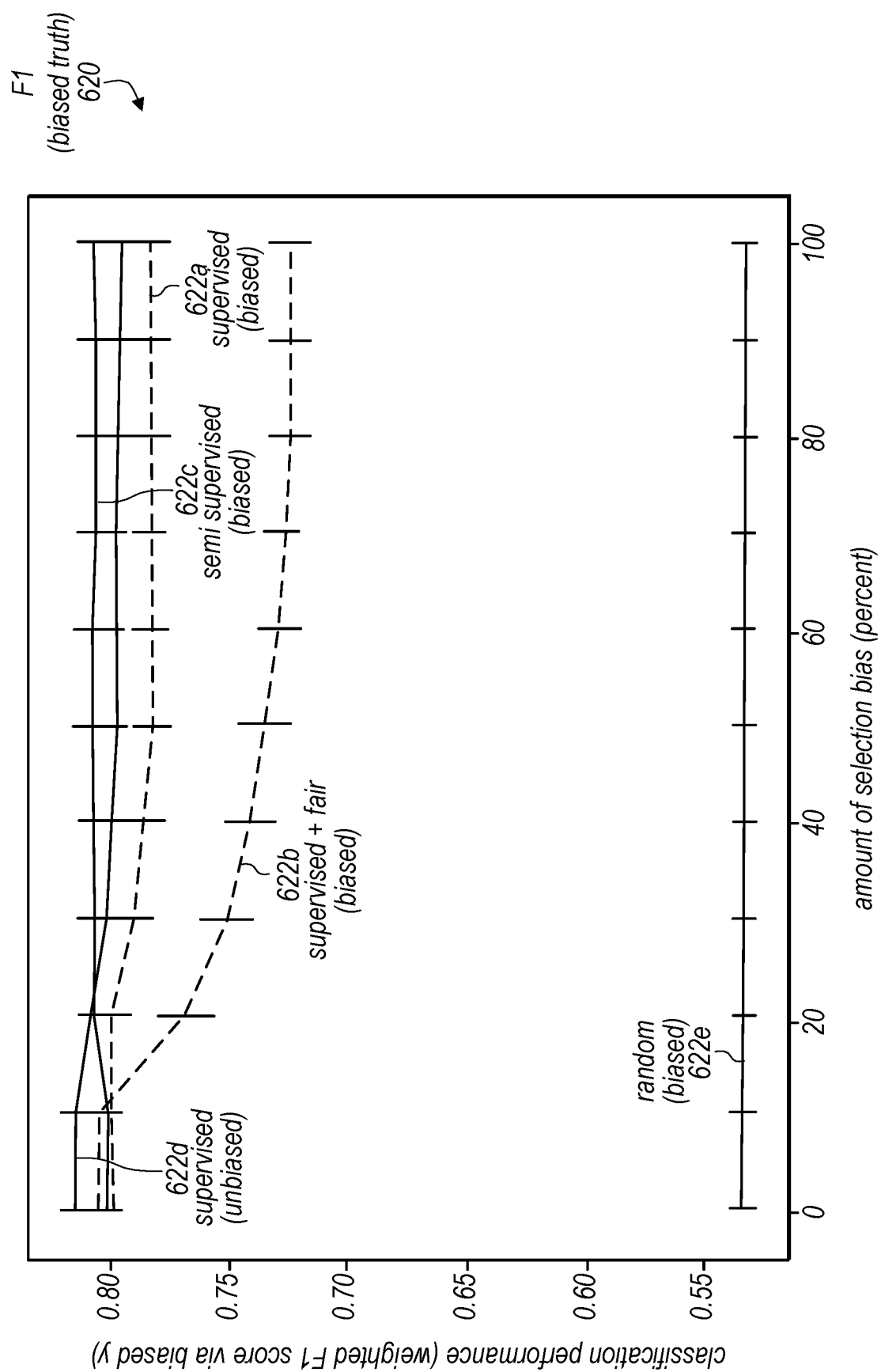
Figure 6C:
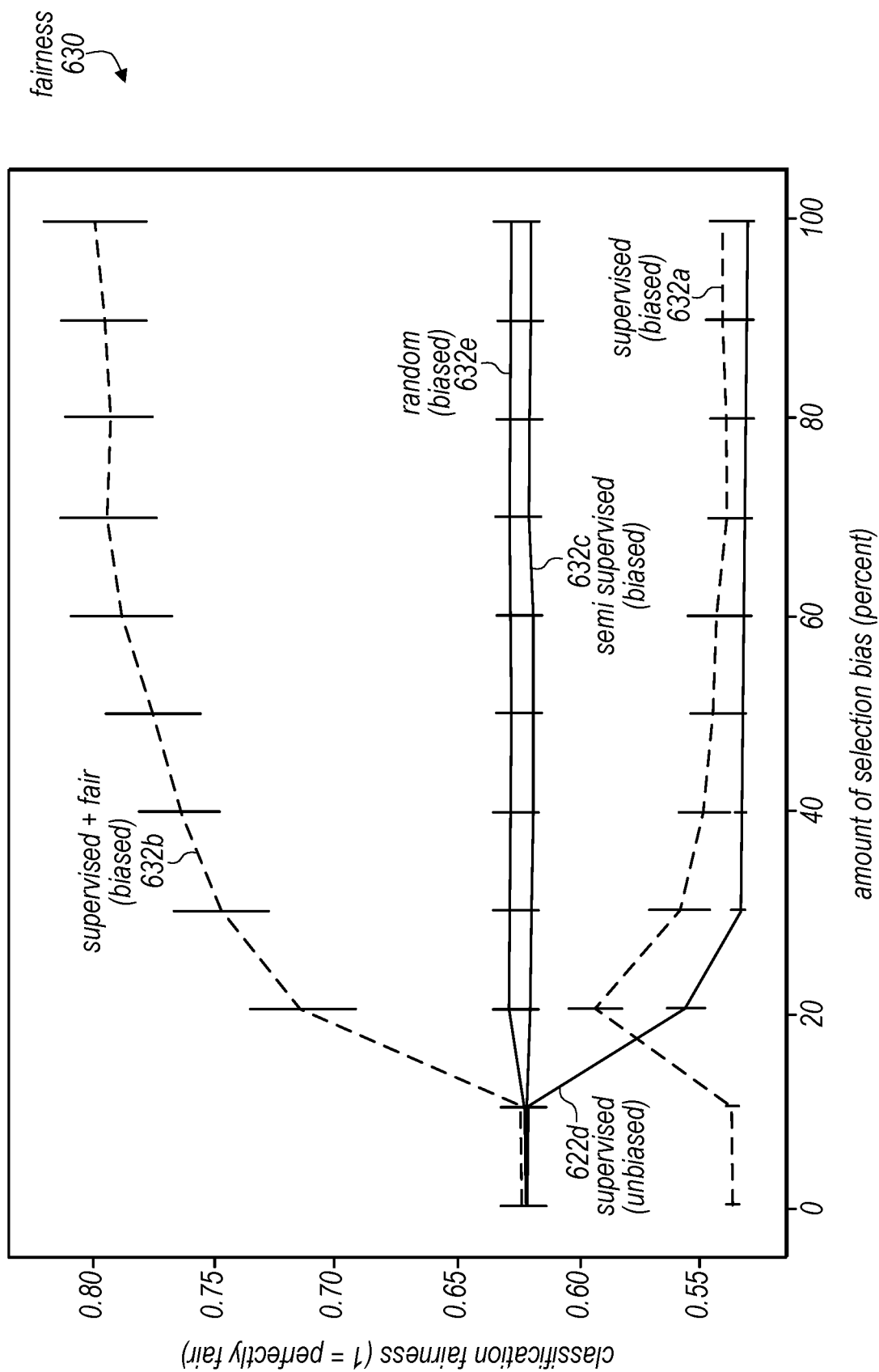

FIG. 4 is a flow diagram illustrating methods and techniques for training an unbiased classifier using the generated data set of FIG. 2A, according to some embodiments. In some embodiments, a machine learning system, such as the Machine Learning System 100, as discussed in connection with FIG. 1, may perform the below techniques. In other embodiments, other systems such as data collection or aggregation systems, data stream processing systems, or other systems, services, or applications that may obtain information that may be used to generate a data set for training a machine learning classifier. As shown in operation 410, a metric may be determined to ensure unbiased classification of labels. This metric may include a fairness, or bias, constraint derived from a statistical parity of selection rates, in some embodiments.

For example, given $S=\{x_i\}_{i=1}^n$ as a set of n unlabeled samples, then a selection rate of $f_w$ is defined as $$\bar{f}_w(S) = \frac{1}{n}\sum_{x_i \in S} f_w(x_i)$$

where $w \in \mathbb{R}^k$ is a set of weights from a k dimensional real valued feature space. For unlabeled samples $\mathcal{D}_{un}$ partitioned into the protected ($\mathcal{D}_{un}^P$) and unprotected ($\mathcal{D}_{un}^U$) partitions, where the protected partition includes features for which fairness may be controlled and the unprotected partition includes remaining features, such that $\mathcal{D}_{un} = \mathcal{D}_{un}^P \cup \mathcal{D}_{un}^U$, the selection rate ratio $$\frac{\bar{f}_w(\mathcal{D}_{un}^P)}{\bar{f}_w(\mathcal{D}_{un}^U)}$$

in some embodiments may be desirable to be as close to one as possible.

In some embodiments, the above definition may be made more amenable to optimization by making it differentiable with respect to the set of weights w. In particular, analogous to $\bar{f}_w(S)$, define $$\bar{p}_w(S) = \frac{1}{n}\sum_{x_i \in S} p_w(y = 1 \mid x_i)$$

to be the average probability of the set when assigning each example $x_i$ to the positive class $y_i=1$. Then, the group fairness loss in some embodiments over the unlabeled data may be $$\mathcal{C}(\mathcal{D}_{un}, w) = (\bar{p}_w(\mathcal{D}_{un}^P) - \bar{p}_w(\mathcal{D}_{un}^U))^2.$$

The determining of a metric to ensure classification of unbiased labels in some embodiments is discussed in further detail in FIGS. 5-8 below. Those skilled in the art will appreciate, however, that the above examples of metrics to ensure unbiased classification of labels are merely illustrative and are not intended to be limiting. Indeed, other bias constraints derived from statistical measures other than parity of selection rates may be desirable and any number of suitable metrics may be envisioned.

As shown in operation 420, the classifier may then be trained using the data set, including the labeled data points and unlabeled data points, as well as the determined metric using semi-supervised learning techniques resulting in a trained classifier that determines unbiased classifications of one or more labels, as discussed in further detail in FIGS. 5-8 below.

Semi-Supervised Learning to Improve Both Fairness and Accuracy

In some embodiments, machine learning classifiers may be trained in a supervised manner in which the classifier is trained labeled samples to assign high probability to observed ground-truth labels for each input sample. In some embodiments, semi-supervised techniques, such as posterior regularization (PR) or generalized expectation criterion (GE), may be performed to supplement labeled samples with additional unlabeled samples. In order to make use of this unlabeled data, which does not include ground-truth labels, prior knowledge may be utilized to specify a type of constraint or expectation that the machine learning system must satisfy over these unlabeled samples. If this prior knowledge correlates with higher accuracy, then forcing the classifier to satisfy the constraint or expectation on unlabeled data may improve the accuracy, in various embodiments.

Using a formal framework to describe various scenarios, such as probably approximately correct (PAC) learning, a data distribution $\mathcal{D}$ and labeling function $f$, may be used, either of which could be biased. For example, due to selection bias a flawed data distribution $\mathcal{D}'$ may occur in various embodiments and due to label bias a flawed labeling function $f'$ may occur in various embodiments. Different regimes may be derived from this in various embodiments, the data distribution being biased ($\mathcal{D}'$) or not biased ($\mathcal{D}$) and the labeling function being biased ($f'$) or not biased ($f$). Embodiments in fair machine learning that consider only the regime in which neither is biased may lead to conclusions assuming the regime in which neither is biased and unfairness may arise precisely because the assumptions are flawed.

In various embodiments, techniques accounting for both label and selection bias may be implemented so that the resulting machine learning classifiers have both improved fairness and accuracy. As unbiased, unobserved labels are difficult to obtain, the simulation of datasets may be performed to expose the actual unbiased labels for evaluation in various embodiments. Theoretical results on semi-supervised PAC learning indicate that these techniques may be successful when there is compatibility between a semi-supervised signal and the data distribution, and in various embodiments a semi-supervised technique that exploits fairness constraints expressed over large quantities of unlabeled data may be implemented to build these improved classifiers. Implementing such embodiments may lead to scenarios where, as fairness improves, so does accuracy. Moreover, in various embodiments the semi-supervised approach may successfully overcome label bias and may also overcome selection bias on the training set, unlike other fairness techniques.

Unlike machine learning techniques that assume the existence of unbiased labels as a way of evaluating fairness with disparate mistreatment that focuses on new fairness metrics, in various embodiments the techniques for ensuring fairness for unlabeled data, as described herein, may successfully control for label bias. For example, simulating data for which the values of the unbiased labels are known may allow control of the degree of the bias. Furthermore, even with biased labels in some embodiments, fairness and accuracy are not necessarily in tension when there is skew in the training set due to another feature like selection bias.

As noted above, two types of biases that lead to unfair machine learning models may include label bias and selection bias, in some embodiments. Label bias may occur when the observed class labels, say, on the training and testing set, are influenced by attributes like the personal attributes discussed above. For example, the labels in the dataset might be the result of hiring decisions for each job candidate. It is known that this hiring process is sometimes biased with respect to personal attribute dimensions such as race, age gender or religion. Since decisions might be influenced by these personal attributes (or other attributes that have no bearing on the class label), this implies there may be a hypothetical set of latent unobserved labels corresponding to decisions that were not influenced by these attributes. In the discussion that follows these unobserved unbiased labels may be represented as z. Observed biased labels may be represented as y. Access to observed bias labels may be for training and testing some classification models.

Selection bias in various embodiments may occur when the method employed to select some subset of the overall population biases or skews the subset in unexpected ways. For example, this may occur if selecting based on some attribute that inadvertently correlates with the either target labels or an attribute such as the example personal attributes discussed above. Training sets may be vulnerable to such bias in various embodiments because, for the sake of manual labeling expedience, they are small subsamples of the original unlabeled data points. Moreover, this situation may be compounded since most available labeled datasets are statically frozen in time and are thus also selectionally biased with respect to time. For example, in natural language processing (NLP), the particular topical subjects or the entities mentioned in newswire articles change over time, thus the entities discussed in political discourse at a particular moment in time may be differ from entities discussed in other time periods. To reduce bias in various embodiments, the discrepancy between the training data of the past and the available data of the present may increasingly differ with regard to selection bias. Indeed, selection bias might manifest such that, on a relatively small training set, the data examples that were selected for labeling happen to show bias in various embodiments against a protected class, for example a personal attribute as discussed above.

In some embodiments, a binary classifier $g_w: \mathbb{R}^k \rightarrow \{0,1\}$ parameterized by a set of weights $w \in \mathbb{R}^k$ is a function from a k dimensional real valued feature space, which is often in practice binary, to a binary class label. A probabilistic model $p_w(\cdot|x)$ parameterized by the same w underlies the classifier in the sense that the classifier may perform classification by selecting the class label (0 or 1) that maximizes the conditional probability of the label y given the data point x $$g_w(x) = \underset{y \in \{0,1\}}{\operatorname{argmax}} p(y \mid x)$$

In some embodiments, the classifier may then be trained in the usual supervised manner by training the underlying model to assign high probability to each observed label $y_i$ in the training data $\mathcal{D}_{tr} = \{\langle x_i, y_i \rangle | i=1 \ldots n\}$ given the corresponding example $x_i$, by minimizing the negative log likelihood:

$$\hat{w} = \underset{w \in \mathbb{R}^k}{\operatorname{argmin}} \sum_{\langle x_i, y_i \rangle \in \mathcal{D}_{tr}} -\log p_w(y_i \mid x_i)$$

In some embodiments, the above objective function may include unlabeled data $\mathcal{D}_{un} = \{x_i\}_{i=1}^n$ to make the training of the classifier semi-supervised. In particular, we add a new term to the loss, $\mathcal{C}(\mathcal{D}_{un}, w)$, with a weight $\alpha$ to control the influence of the unlabeled data over the learned weights:

$$\hat{w} = \underset{w \in \mathbb{R}^k}{\operatorname{argmin}} \left( \sum_{\langle x_i, y_i \rangle \in \mathcal{D}_{tr}} -\log p_w(y_i \mid x_i) \right) + C(D_{un}, w)$$

Approaches to define this new loss term $\mathcal{C}$ over the unlabeled data may be performed in such a way that improves both fairness and accuracy of the trained classifier.

In various embodiments, fairness may be employed in the part of the loss term that exploits the unlabeled data. Various different definitions of fairness may be implemented. One such example a particular type of fairness constraint may be derived from the statistical parity of selection rates, in some embodiments.

For a set of n unlabeled examples $S = \{x_i\}_{i=1}^n$, the selection rate of a classifier $f_w$ is $$\bar{f}_w(S) = \frac{1}{n} \sum_{x_i \in S} f_w(x_i).$$

If data ($\mathcal{D}_{un}$) is partitioned into the protected ($\mathcal{D}_{un}^P$) and unprotected ($\mathcal{D}_{un}^U$) partitions such that $\mathcal{D}_{un} = \mathcal{D}_{un}^P \cup \mathcal{D}_{un}^U$, then the selection rate ratio $$\frac{\bar{f}_w(\mathcal{D}_{un}^P)}{\bar{f}_w(\mathcal{D}_{un}^U)}$$

may be desirable in some embodiments to be as close to one as possible. However, to make the above scenario more amenable to optimization, this definition of fairness in some embodiments may be relaxed to make it differentiable with respect to the set of weights w. In particular, analogous to $$\bar{f}_w(S), \bar{p}_w(S) = \frac{1}{n} \sum_{x_i \in S} p_w(y=1 \mid x_i)$$

may be the average probability of the set when assigning each example $x_i$ to the positive class $y_i=1$ in some embodiments. The group fairness loss over the unlabeled data, which when plugged into the equation for $\hat{w}$ above, then yields an instantiation of the proposed semi-supervised training technique discussed herein, is $$\mathcal{L}(\mathcal{D}_{un}, w) = (\bar{p}_w(\mathcal{D}_{un}^P) - \bar{p}_w(\mathcal{D}_{un}^U))^2$$

In various embodiments, parity may be achieved at zero, which may encode that overall, the probability of assigning one group to the positive class may on average be the same as assigning the other group to the positive class. This loss may have the property that it is differentiable with respect to the set of weights w so it may be more easily optimized, along with the supervised term of the objective, making it easy to implement in some embodiments in existing machine learning toolkits.

In various embodiments, data may be simulated in such a way that the various types of bias may be controlled, then controlled biases may be accounted for during evaluation to make known the unbiased labels in the training set. In some embodiments, a technique for generating simulated data may exhibit various properties. First, the unobserved unbiased labels $z_i$ may not statistically depend on the example's status as protected $\rho_i$ and only on its other input features $x_i$. Second, the protected status $\rho$ may not depend on any features $x_i$. Third, the observed biased labels $y_i$ may be biased to depend on the protected status $\rho$ by an amount controlled by the experimental parameter $\beta$, which may be varied in the experiments. Thus, in some embodiments, the following statistical properties may be enforced:

$$z, x \perp\!\!\!\perp \rho \quad y \not\!\perp\!\!\!\perp \rho$$
$$z \not\!\perp\!\!\!\perp x \quad y \not\!\perp\!\!\!\perp z$$

Where $\perp\!\!\!\perp$ (respectively, $\not\!\perp\!\!\!\perp$) are the familiar symbols for expressing statistical independence (respectively, dependence) of random variables. Note that when selection bias is introduced in some embodiments, it may violate some of these independence assumptions (between $\rho$ and z, x) but in a controlled manner so that it may be shown to what extent the unlabeled data is corrected as the amount of selection bias is varied. In an example application, 20-dimensional binary input features $x_i$ may be generated and unless otherwise stated, 200 training examples, 1000 testing examples and 10,000 unlabeled examples. Note that 200 training examples may be reasonable since it means that n>>k as is usually required for training machine learning models. Yet, at the same time, it is small enough to allow for the weights of some of the rarer features to be under-fit as may be typical in many applications of machine learning. Also, unless otherwise stated, the expected protected to unprotected class ratio is even at 50/50.

In various embodiments, a traditional supervised classifier trained on biased label data, a supervised classifier trained on unbiased label data, a random baseline in which labels are sampled according to the biased label distribution in the training data, and two fair classifiers may be implemented. In some embodiments, the first fair classifier may be an in-processing classifier in which fairness is utilized as part of the objective on the training data. In some embodiments, the second fair classifier may be a semi-supervised classifier that utilizes a fairness loss on the unlabeled data.

In some embodiments, fairness may be assessed with a group metric that computes the ratio of the selection rates of the protected and unprotected classes, as discussed above with regard to the equation, $$\frac{\bar{f}_w(\mathcal{D}_{un}^P)}{\bar{f}_w(\mathcal{D}_{un}^U)}.$$

A score of one may be considered perfectly fair. This definition is symmetric so a score above one is considered unfair.

In FIGS. 5-8, to assess accuracy, a weighted macro F1 is computed in some embodiments, which may be the macro average weighted by the relative portion of examples belonging to the positive and negative classes. F1 may be evaluated with respect to both the observed biased labels and the unobserved unbiased labels. The mean and standard error of these various metrics may be computed over different applications (e.g., ten applications with ten randomly generated datasets).

To investigate whether improving fairness also improves accuracy in the classic setting in which the training, testing and unlabeled data all come from the exact same distribution, the amount of label bias along the abscissa may be varied and report various classifier (e.g., supervised (biased) classifiers 510a, 520a, 530a, 610a, 620a, 630a, 710a, 720a, 730a, 810a, 820a, and 830a, supervised+fair (biased) classifiers 510b, 520b, 530b, 610b, 620b, 630b, 710b, 720b, 730b, 810b, 820b, and 830b, semi supervised (biased) classifiers 510c, 520c, 530c, 610c, 620c, 630c, 710c, 720c, 730c, 810c, 820c, and 830c, supervised (unbiased) classifiers 510d, 510d, 530d, 610d, 620d, 620d, 710d, 720d, 730d, 810d, 820d, and 830d, and random (biased) classifiers 510e, 520e, 530e, 610e, 620e, 630e, 710e, 720e, 730e, 810e, 820e, and 830e in FIGS. 5-8) characteristics (e.g., F1 score against unbiased labels as illustrated in elements 510, 610, 710, and 810 F1 score against biased labels as illustrated in elements 520, 620, 720, and 820, and fairness as illustrated in elements 530, 630, 730, and 830, in FIGS. 5-8 respectively). In various embodiments, classifiers may be trained on the biased labels except for the supervised (unbiased) classifier, which may be trained on the unbiased labels that are ordinarily not available for training. This classifier serves, in a sense, as an upper bound, and is thus not affected by the amount of label bias unless evaluated against it. The supervised (biased) classifier represents the usual unfair classifier that is trained on the biased labels without additional fairness constraints. In some embodiments, two fair classifiers may be trained, one that uses fairness constraints as a regularizer on the test set and the other that uses fairness constraints as a semi-supervised learning signal on unlabeled data.

The mean and standard error may be reported over ten randomly generated datasets for each condition illustrated in FIG. 7, discussed below. Results consistent with a theory in which fairness and accuracy are in tension may show that the closer a classifier's fairness score is to one, the lower the F1 score of the classifier. By first comparing each classifier's fairness (730 in FIG. 7) and then their respective biased F1 score (720 in FIG. 7), we see that this is indeed the case. For example, the supervised classifier trained on biased data is less fair and more accurate than the two fair classifiers. In contrast, when making the same comparison, but this time accounting for label bias by evaluating the respective classifier's F1 scores with respect to the unbiased labels (FIG.

7a), we see the exact opposite result. A result, in fact, consistent with the finding that fairness improves accuracy.

Figure 7A:
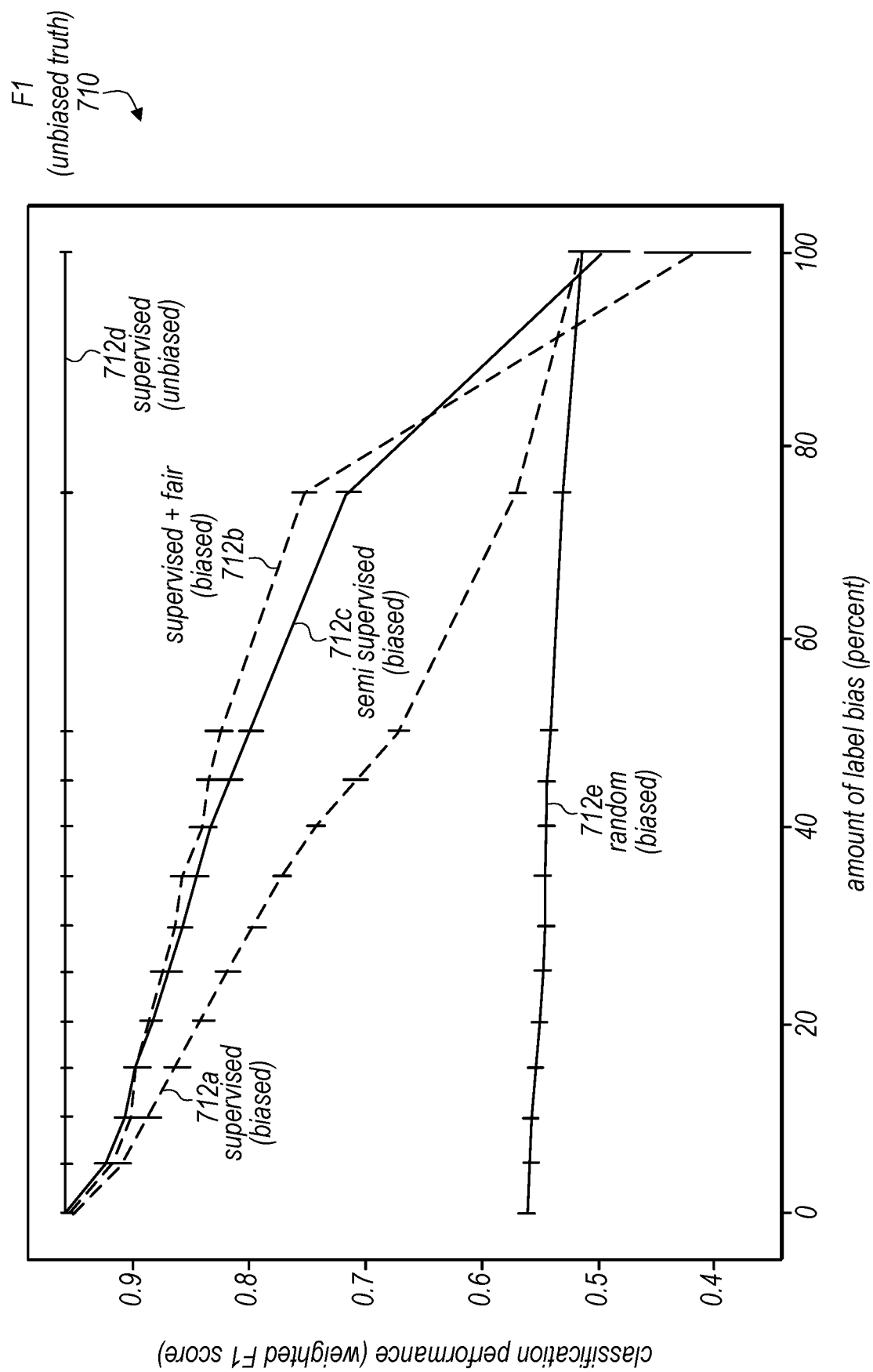
FIGS. 7A-7C illustrate further examples of classification performance of differently trained classifiers for amounts of label bias, according to some embodiments.
Figure 7B:
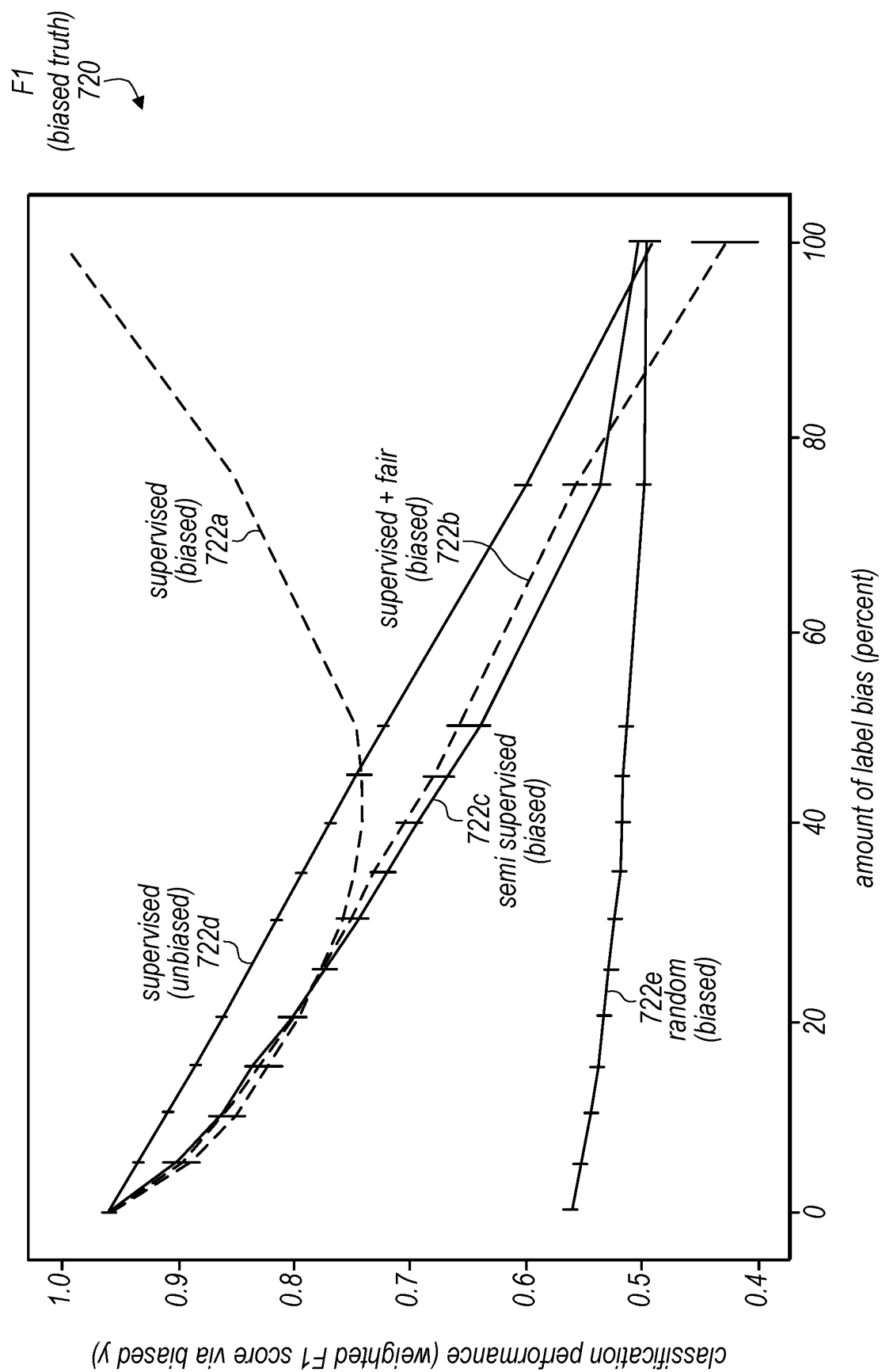
Figure 7C:
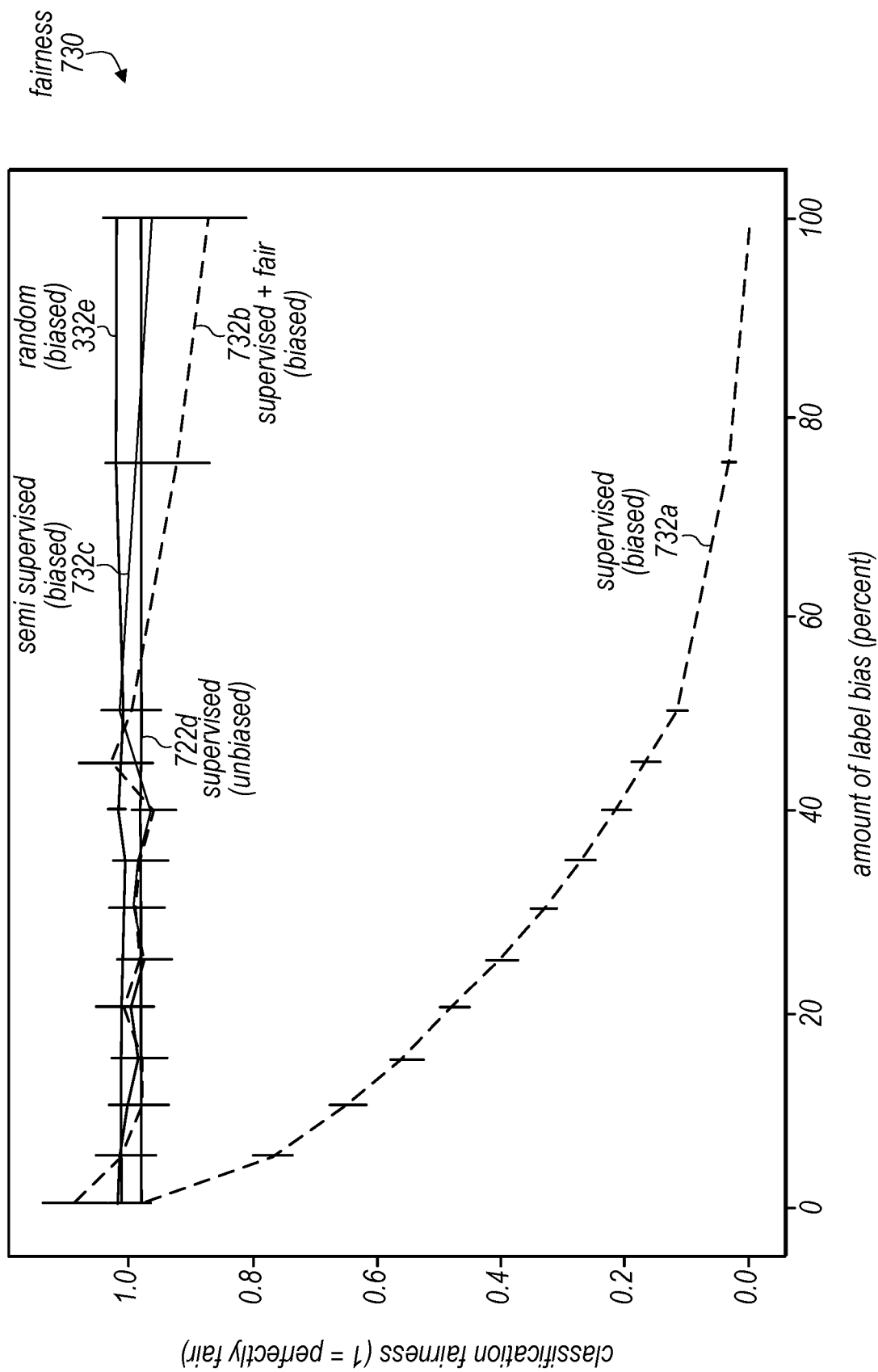

In element 720 of FIG. 7, the biased labels may be construed as actual unbiased ground-truth. In this interpretation, an all equal assumption fails to hold to increasingly large degrees along the x-axis. In this scenario initially, the fair classifiers (that enforce the all equal assumption) are robust to the incorrect assumption, but eventually succumb when the degree to which it is violated exceeds about 20%.

Figure 8A:
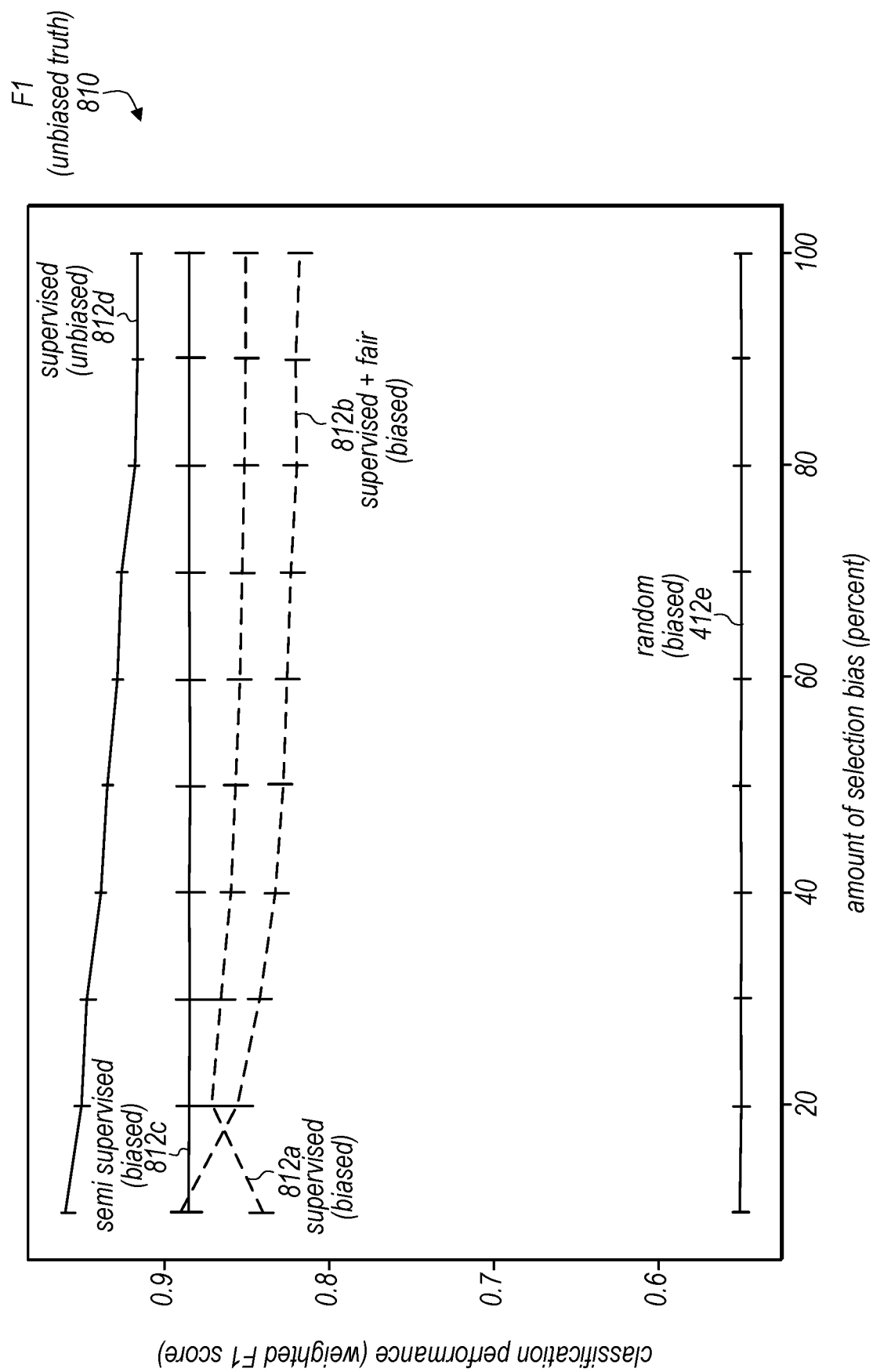
FIGS. 8A-8C illustrate further examples of classification performance of differently trained classifiers according to amounts of selection bias, according to some embodiments.
Figure 8B:
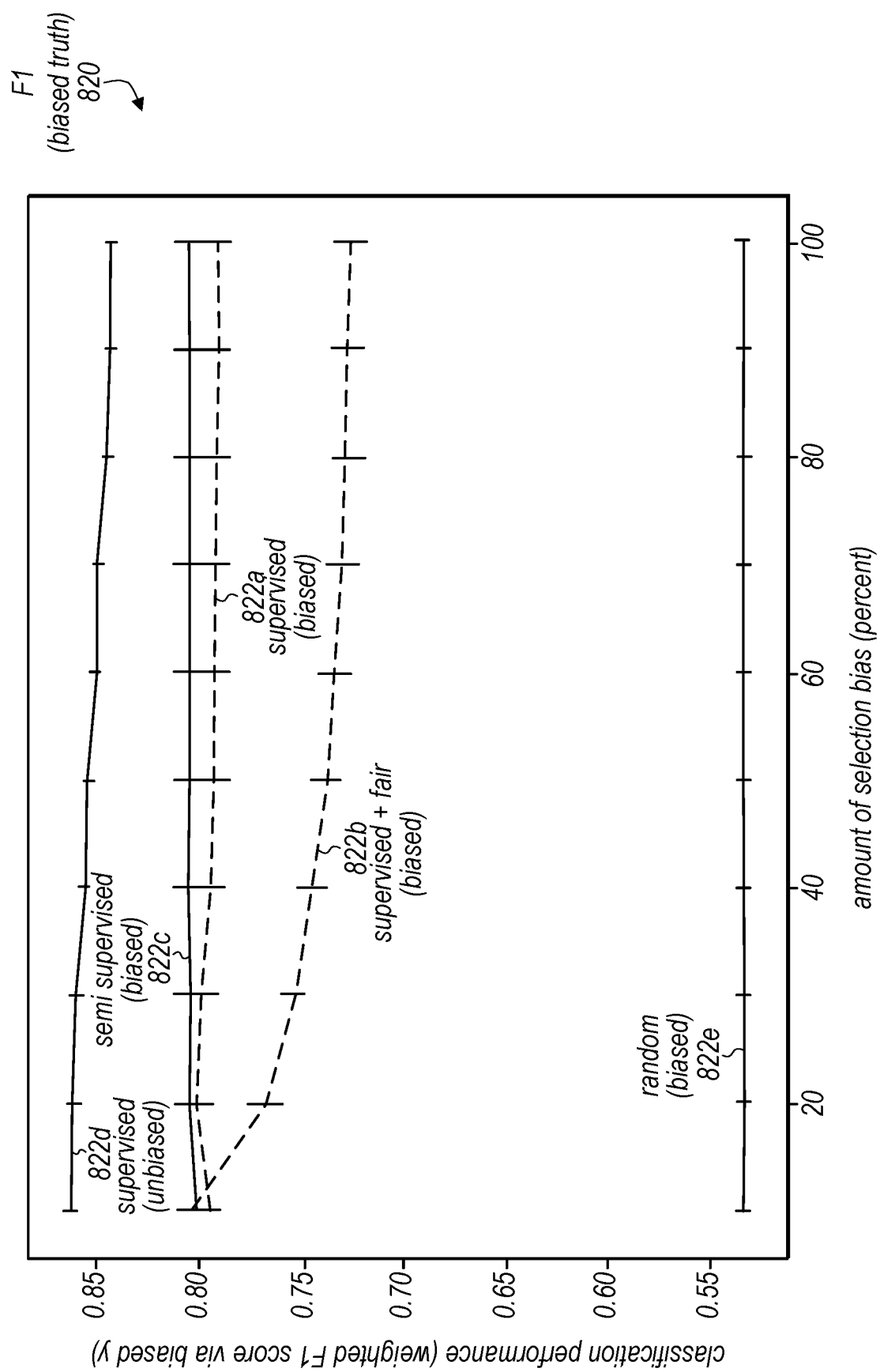
Figure 8C:
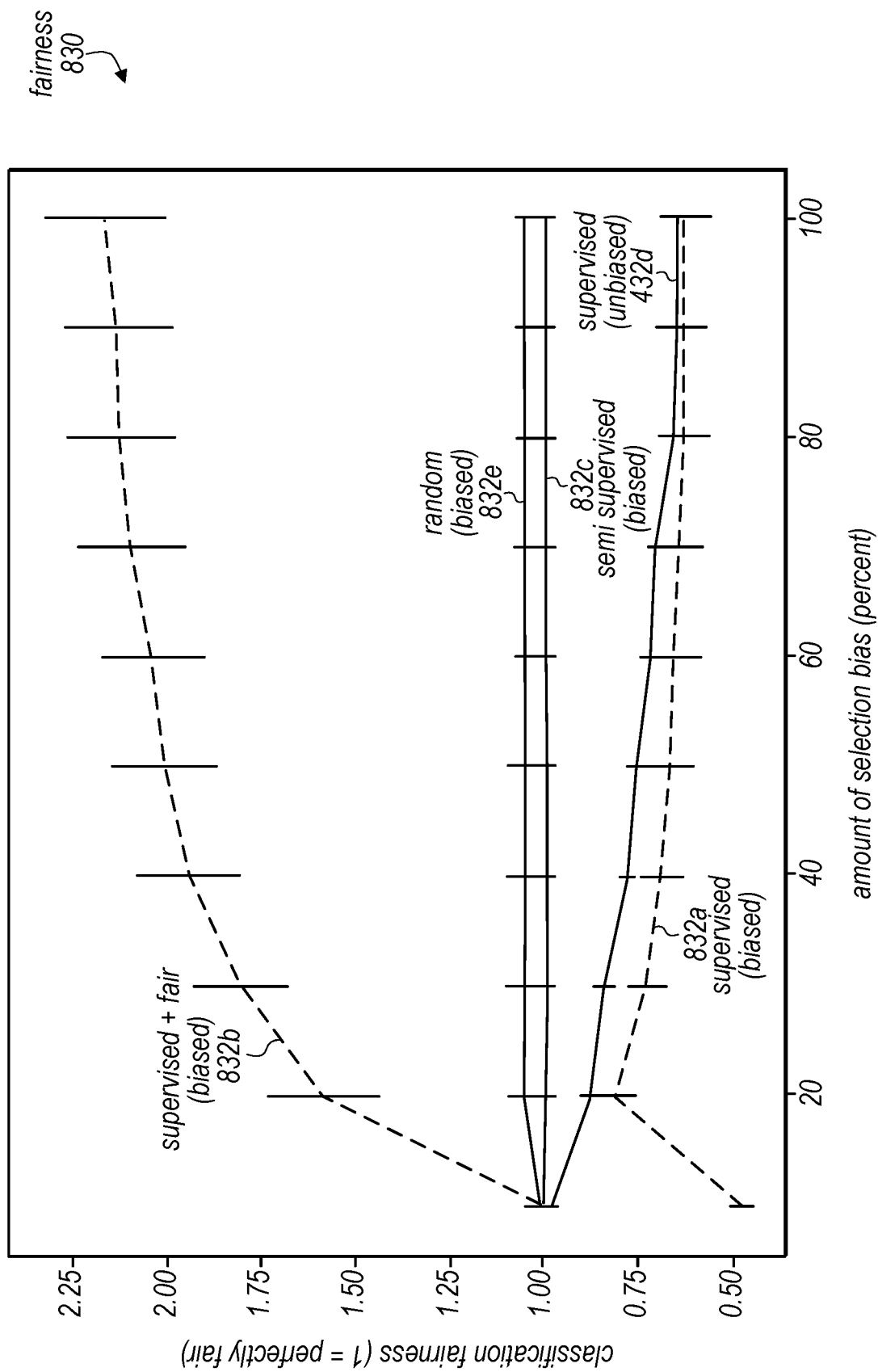

In other applications, the label bias may be fixed, subjecting the training data to various amounts of selection bias by lowering the probability that a data example with a positive label is assigned to the protected class. This introduces correlations in the training set between the protected class and the input features as well as correlations with both the unbiased and biased labels. These correlations do not exist in the test set and unlabeled set which may be assumed to not suffer from selection bias. In various applications, selection bias may be varied along the abscissa while keeping the label bias at a constant 20%, and report the same metrics as before. FIG. 8 illustrates results of these applications.

The results illustrated in FIG. 8 may be indicate that (a) fairness and accuracy are in accord and (b) that the semi-supervised method successfully harnesses unlabeled data to correct for the selection and label bias in the training data while the in-processing fairness method succumbs to the difference in data distribution between training and testing.

It might be expected that the traditional fairness-agnostic supervised classifier would learn the statistical dependence between the protected attributes and the target label and translate them to the evaluation data at test-time. For example, 830 in FIG. 8 shows that the classifier becomes increasingly unfair as selection bias increases. Likewise, the classifier becomes increasingly inaccurate, although eventually plateauing, when evaluated not only against the unbiased labels, as illustrated at 810, but also the biased labels, as illustrated at 820. Thus, the examples may show that fairness and accuracy are in accord and that being unfair against the protected class reduces overall accuracy.

If fairness is enforced in some embodiments with the usual in-processing technique supervised+fair (biased) 832b that employs the fairness loss term as a "regularizer" on the training set, the classifier learns to overcompensate proportionally, as seen at 830, since the training set exhibits varying degrees of selection bias. Again the classifier 832b becomes increasingly unfair, but this time in favor of the protected class, rather than against it, as represented by classification fairness values above one. Moreover, as seen in the corresponding accuracy plots 812b and 822b, this decrease in fairness corresponds to a concomitant decrease in accuracy. Again, fairness and accuracy are in accord, being unfair against the unprotected class reduces overall accuracy.

In another embodiment, the performance of the proposed semi-supervised method may be considered. Again, returning to the same set of plots, we see that regardless of the amount of selection bias, the semi-supervised method successfully harnesses the unbiased unlabeled data to rectify the selection bias, as seen by the flat fairness curve achieving a nearly perfect classification fairness 832c. Moreover, this improvement in fairness over the two previously mentioned supervised baselines is associated with a corresponding increase in accuracy relative to those same baselines (812c and 822c), regardless of whether it is evaluated with respect to biased (20% label bias) or unbiased labels (0% label bias). Note that the all equal assumption is violated as soon as it is evaluated against biased labels. Moreover, label bias induces a correlation between the protected class and the target label, which is a common assumption for analysis showing that fairness and accuracy are in tension. Yet, the finding that accuracy and fairness are in accord remains intact because selection bias infiltrated the classifier causing a dip in its achievable maximum accuracy. Possibly due to the same effect, the semi-supervised method outperforms the supervised baseline that is trained on unbiased labels.

In various embodiments, generated simulated data may be used to show that if label and selection bias are not accounted for, classification results may indicate that accuracy and fairness are in tension. However, as soon as one or both of these phenomena are accounted for, fairness and accuracy may be in accord. Moreover, the semi-supervised method of enforcing fairness appears to perform better than other classifiers considered. Indeed, the semi-supervised method performs well under varying degrees of different types of bias.

In various embodiments, techniques for simulating data may be performed in such a way that the various type of biases may be controlled and accounted for during evaluation, since the unobserved ground-truth labels necessary for doing so may be known.

To simulate the dataset, samples of the input data points x, independently and identically distributed from a binary feature space of multiple dimensions, may be taken in some embodiments. The sampling may be performed such that some dimensions contain common features while others contain rare features in effort to reflect real-world datasets, in some embodiments. For example, each dimension i may be sampled according to a Bernoulli distribution proportional to $$\frac{1}{i}$$

making some dimensions common and others rare.

The parameters of a data generator for simulated data in various embodiments may be $\beta$ the amount of label bias, $\tau$, which controls the discrepancy between the rarity of features, and $\alpha$, which controls the ratio between members of the protected and unprotected class. Another parameter may also be implemented that controls the amount of selection bias. The observed samples $x_i$ may be sampled independent of protected status, where protected status is either protected ($\rho=1$) or not protected ($\rho=0$), to ensure that protected status and input features are not statistically dependent. Next, the unobserved unbiased labels z from $x_i$ may be sampled while ignoring the protected status $\rho_i$ to ensure that the label is indeed unbiased. Finally, the observed biased labels y may be sampled in a way to make them dependent on the class labels $\rho_i$, a dependency strength controlled by $\beta$. More precisely:

$$w_{gen} \sim N(0, \Sigma)$$

$$\rho_i \sim \text{Bernoulli}(\alpha)$$

$$x_i^j \sim \text{Bernoulli}\left(\frac{1}{j+1}\right)^\tau \text{ for } j = 0, \ldots, k-2$$

$$z_i = \max(0, \text{sign}(w_{gen}^T x + i))$$

$$y_i \sim g(z_i, \rho_i; \beta)$$

where g is the label bias function, parameterized by β, the amount of label bias to introduce, and is a function of the protected dimension and the unobserved unbiased labels $z_i$, and defined as $$g(z_i, \rho_i; \beta) = \begin{cases} 1 - \rho_i & \text{if Bernoulli}(\beta) \\ z_i & \text{otherwise} \end{cases}$$

Figure 9:
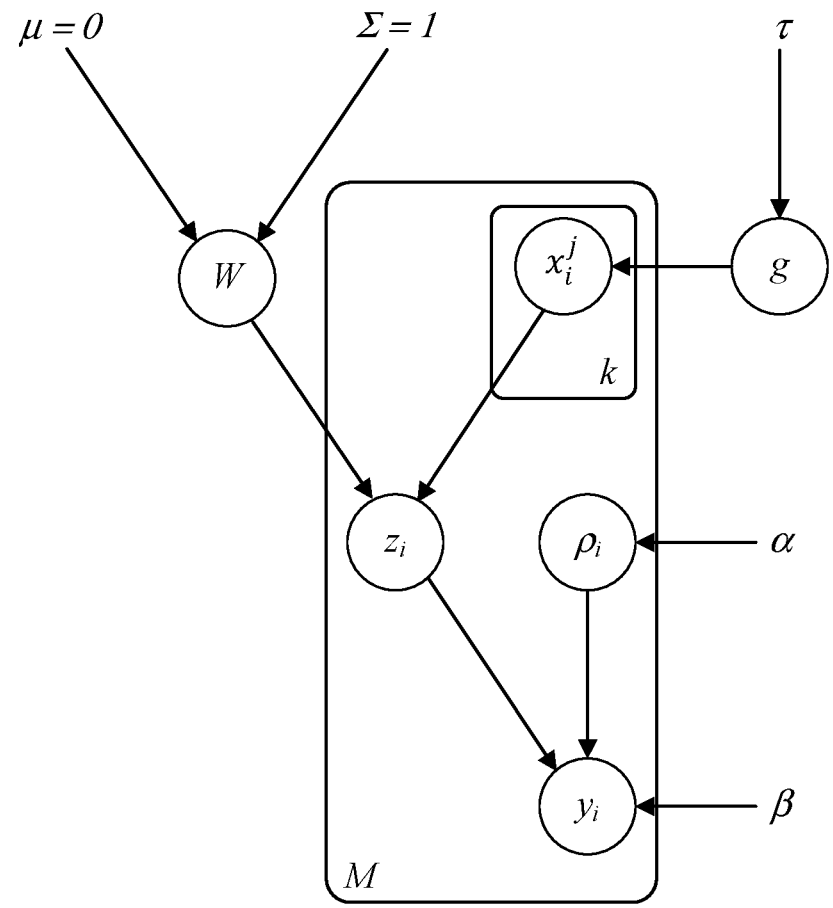
FIG. 9 illustrates an example data generator for simulating data to ensure fairness on unlabeled data, according to some embodiments.

In various embodiments, the function may return the unbiased labels with probability 1−β, but otherwise works against examples of the protected class by assigning their labels to 0, and for all other examples by assigning their labels to 1. FIG. 9 illustrates for a Bayesian network representation of the generator.

Representative System

FIG. 10 illustrates a computing system configured to implement the methods and techniques described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing enforcing fairness on unlabeled data to improve modeling performance on a computing system, as described herein, may be provided as a computer program product, or software, that may include a non-transitory, computer-readable storage medium having stored thereon instructions, which may be used to program a computer system (or other electronic devices) to perform a process according to various embodiments. A non-transitory, computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. Each of the processors 1070 may include a hierarchy of caches, in various embodiments. The computer system 1000 may also include one or more persistent storage devices 1060 (e.g. optical storage, magnetic storage, hard drive, tape drive, solid state memory, etc.) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 10 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement various features described above, including a data generator 1022 as discussed above with regard to FIG. 5 and classifier(s) 1024 that may perform the various analysis on simulated data as discussed above with regard to FIGS. 1-4, in some embodiments as described herein. Program instructions 1020 may be encoded in platform native binary, any interpreted language such as Java™ byte-code, or in any other language such as C/C++, Java™, etc. or in any combination thereof. System memories 1010 may also contain LRU queue(s) 1026 upon which concurrent remove and add-to-front operations may be performed, in some embodiments.

In one embodiment, Interconnect 1090 may be configured to coordinate I/O traffic between processors 1070, storage devices 1070, and any peripheral devices in the device, including network interfaces 1050 or other peripheral interfaces, such as input/output devices 1080. In some embodiments, Interconnect 1090 may perform any necessary protocol, timing or other data transformations to convert data signals from one component (e.g., system memory 1010) into a format suitable for use by another component (e.g., processor 1070). In some embodiments, Interconnect 1090 may include support for devices attached through various types of peripheral buses, such as a variant of the Peripheral Component Interconnect (PCI) bus standard or the Universal Serial Bus (USB) standard, for example. In some embodiments, the function of Interconnect 1090 may be split into two or more separate components, such as a north bridge and a south bridge, for example. In addition, in some embodiments some or all of the functionality of Interconnect 1090, such as an interface to system memory 1010, may be incorporated directly into processor 1070.

Network interface 1050 may be configured to allow data to be exchanged between computer system 1000 and other devices attached to a network, such as other computer systems, or between nodes of computer system 1000. In various embodiments, network interface 1050 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1080 may, in some embodiments, include one or more display terminals, keyboards, keypads, touchpads, scanning devices, voice or optical recognition devices, or any other devices suitable for entering or retrieving data by one or more computer system 1000. Multiple input/output devices 1080 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1050.

Those skilled in the art will appreciate that computer system 1000 is merely illustrative and is not intended to limit the scope of the methods for providing enhanced accountability and trust in distributed ledgers as described herein. In particular, the computer system and devices may include any combination of hardware or software that may perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A method, comprising:
    training, by a machine learning system comprising at least one processor and a memory, a classifier that, when applied to one or more data sets determines classifications of one or more labels for the one or more data sets, the training comprising:
        labeling unlabeled data according to a specified amount of bias to generate labeled data comprising the specified amount of bias, wherein the specified amount of bias comprises one or more of a specified amount of label bias and a specified amount of selection bias in at least one dimension of a plurality of label dimensions;
        generating a training data set comprising samples of the labeled data and additional unlabeled data; and
        training the classifier according to the generated training data set and training parameters comprising an indication the specified amount of bias.

2. The method of claim 1, wherein the specified amount of bias comprises the specified amount of label bias, and wherein labeling the unlabeled data comprises labeling data points of the unlabeled data, comprising unobserved ground truths, according to the specified amount of label bias.

3. The method of claim 1, wherein the specified amount of bias comprises the specified amount of selection bias, and wherein generating the training data set comprises sampling the labeled data according to the specified amount of selection bias.

4. The method of claim 1, wherein the specified amount of bias comprises the specified amount of label bias and the specified amount of selection bias, and wherein the training parameters comprise the specified amount of label bias, the specified amount of selection bias and a specified control for discrepancy between rarity of features.

5. The method of claim 4, wherein generating the training data set comprises sampling the labeled data according to the specified control for the discrepancy between the rarity of features.

6. The method of claim 1, wherein the training of the classifier comprises semi-supervised training.

7. The method of claim 6, wherein the semi-supervised training comprises a metric to promote unbiased classification of one or more labels based, at least in part, on the additional unlabeled data points.

8. One or more non-transitory computer-accessible storage media storing program instructions that when executed on or across one or more processors cause the one or more processors to implement a machine learning system to perform:
    training a classifier that, when applied to one or more data sets determines classifications of one or more labels for the one or more data sets, the training comprising:
        labeling unlabeled data according to a specified amount of bias to generate labeled data comprising the specified amount of bias, wherein the specified amount of bias comprises one or more of a specified amount of label bias and a specified amount of selection bias in at least one dimension of a plurality of label dimensions;
        generating a training data set comprising samples of the labeled data and additional unlabeled data; and
        training the classifier according to the generated training data set and training parameters comprising an indication the specified amount of bias.

9. The one or more non-transitory computer-accessible storage media of claim 8, wherein the specified amount of bias comprises the specified amount of label bias, and wherein labeling the unlabeled data comprises labeling data points of the unlabeled data, comprising unobserved ground truths, according to the specified amount of label bias.

10. The one or more non-transitory computer-accessible storage media of claim 8, wherein the specified amount of bias comprises the specified amount of selection bias, and wherein generating the training data set comprises sampling the labeled data according to the specified amount of selection bias.

11. The one or more non-transitory computer-accessible storage media of claim 8, wherein the specified amount of bias comprises the specified amount of label bias and the specified amount of selection bias, and wherein the training parameters comprise the specified amount of label bias, the specified amount of selection bias and a specified control for discrepancy between rarity of features.

12. The one or more non-transitory computer-accessible storage media of claim 11, wherein generating the training data set comprises sampling the labeled data according to the specified control for the discrepancy between the rarity of features.

13. The one or more non-transitory computer-accessible storage media of claim 8, wherein the training of the classifier comprises semi-supervised training.

14. The one or more non-transitory computer-accessible storage media of claim 13, wherein the semi-supervised training comprises a metric to promote unbiased classification of one or more labels based, at least in part, on the additional unlabeled data points.

15. A system, comprising:
- at least one processor;
- a memory, comprising program instructions that when executed by the at least one processor cause the at least one processor to implement a machine learning system configured to train a classifier that, when applied to one or more data sets determines classifications of one or more labels for the one or more data sets, wherein to train the classifier the machine learning system is configured to:
  - label unlabeled data according to a specified amount of bias to generate labeled data comprising the specified amount of bias, wherein the specified amount of bias comprises one or more of a specified amount of label bias and a specified amount of selection bias in at least one dimension of a plurality of label dimensions;
  - generate a training data set comprising samples of the labeled data and additional unlabeled data; and
  - train the classifier according to the generated training data set and training parameters comprising an indication the specified amount of bias.

16. The system of claim 15, wherein the specified amount of bias comprises the specified amount of label bias, and wherein labeling the unlabeled data comprises labeling data points of the unlabeled data, comprising unobserved ground truths, according to the specified amount of label bias.

17. The system of claim 15, wherein the specified amount of bias comprises the specified amount of selection bias, and wherein generating the training data set comprises sampling the labeled data according to the specified amount of selection bias.

18. The system of claim 15, wherein the specified amount of bias comprises the specified amount of label bias and the specified amount of selection bias, and wherein the training parameters comprise the specified amount of label bias, the specified amount of selection bias and a specified control for discrepancy between rarity of features.

19. The system of claim 18, wherein generating the training data set comprises sampling the labeled data according to the specified control for the discrepancy between the rarity of features.

20. The system of claim 15, wherein the training of the classifier comprises semi-supervised training, and wherein the semi-supervised training comprises a metric to promote unbiased classification of one or more labels based, at least in part, on the additional unlabeled data points.

* * * * *

UNITED STATES PATENT AND TRADEMARK OFFICE
CERTIFICATE OF CORRECTION

PATENT NO. : 12,175,344 B2
APPLICATION NO. : 18/453929
DATED : December 24, 2024
INVENTOR(S) : Wick et al.

Page 1 of 1

It is certified that error appears in the above-identified patent and that said Letters Patent is hereby corrected as shown below:

On the Title Page

On page 2, Column 1, under item (56) Other Publications, Line 25, delete "(im)possiblity" and insert -- (im)possibility --, therefor.

On page 3, Column 2, under item (56) Other Publications, Line 10, delete "Serch" and insert -- Search --, therefor.

On page 3, Column 2, under item (56) Other Publications, Line 22, delete "Jouranl" and insert -- Journal --, therefor.

In the Specifications

In Column 4, Line 23, delete "an" and insert -- and --, therefor.

In Column 8, Lines 5-7, Delete "$\mathcal{C}(\mathcal{D}_{un}, w) = (\bar{p}_w(\mathcal{D}_{un}^P) - \bar{p}_w(\mathcal{D}_{un}^U))^2$" and insert -- $\mathcal{C}(\mathcal{D}_{un}, w) = (\bar{p}_w(\mathcal{D}_{un}^P) - \bar{p}_w(\mathcal{D}_{un}^U))^2$ --, therefor.

Signed and Sealed this
First Day of April, 2025

Coke Morgan Stewart
*Acting Director of the United States Patent and Trademark Office*